US012804121B2

(12) United States Patent
Yamazaki et al.

(10) Patent No.: US 12,804,121 B2
(45) Date of Patent: Nov. 17, 2026

(54) DISPLAY DEVICE

(71) Applicant: SEMICONDUCTOR ENERGY LABORATORY CO., LTD., Atsugi (JP)

(72) Inventors: Shunpei Yamazaki, Tokyo (JP); Yosuke Tsukamoto, Atsugi (JP); Ryo Hatsumi, Hadano (JP); Koji Kusunoki, Isehara (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 0 days.

(21) Appl. No.: 18/698,878

(22) PCT Filed: Nov. 17, 2022

(86) PCT No.: PCT/IB2022/061053
§ 371 (c)(1),
(2) Date: Apr. 5, 2024

(87) PCT Pub. No.: WO2023/094945
PCT Pub. Date: Jun. 1, 2023

(65) Prior Publication Data

US 2024/0414311 A1 Dec. 12, 2024

(30) Foreign Application Priority Data

Nov. 26, 2021 (JP) ................................ 2021-192241

(51) Int. Cl.
*H04N 13/344* (2018.01)
*G02B 27/01* (2006.01)
(Continued)

(52) U.S. Cl.
CPC ....... *H04N 13/344* (2018.05); *G02B 27/0172* (2013.01); *H04N 13/368* (2018.05);
(Continued)

(58) Field of Classification Search
CPC .. H04N 13/344; H04N 13/368; H04N 13/383; H04N 13/398; H04N 5/64;
(Continued)

(56) References Cited

U.S. PATENT DOCUMENTS 5,953,985 A 9/1999 Kobayashi
6,120,338 A 9/2000 Hirano et al.
(Continued)

FOREIGN PATENT DOCUMENTS

CN 205899143 U 1/2017
CN 108027514 A 5/2018
(Continued)

OTHER PUBLICATIONS

International Search Report (Application No. PCT/IB2022/061053) Dated Jan. 24, 2023.
(Continued)

*Primary Examiner* — Tung T Vo
(74) *Attorney, Agent, or Firm* — NIXON PEABODY LLP; Jeffrey L. Costellia

(57) ABSTRACT

High definition and a large screen are achieved with the use of a direct-view image display device including a small number of optical systems or no optical system. A personal image display device providing the sense of immersion is achieved. A display device of the present invention is a display device placed at least on the front side of a user's visual field. The display device uses a flexible film, has a curved surface, and has a display surface on the user's side of the display device. Display is performed inside a space on the user's side of the display device, and the rear surface of the display device is placed on the side opposite to the user's side of the display device. The user's side of the display
(Continued)

device may be provided with a large display region, or a see-through display region of the display device may display only some marks.

8 Claims, 13 Drawing Sheets

(51) Int. Cl.
*H04N 13/368* (2018.01)
*H04N 13/383* (2018.01)
*H04N 13/398* (2018.01)

(52) U.S. Cl.
CPC ......... *H04N 13/383* (2018.05); *H04N 13/398* (2018.05); *G02B 2027/013* (2013.01)

(58) Field of Classification Search
CPC .............. H04N 13/332; G02B 27/0172; G02B 2027/013; G02B 27/02; G02B 30/00; G02B 27/017; G02B 2027/0178
USPC ............................................................ 348/51
See application file for complete search history.

(56) References Cited

U.S. PATENT DOCUMENTS 7,248,997 B2 7/2007 Nagai et al.
8,358,317 B2 * 1/2013 Carlson ................... G06T 15/04 345/545
9,614,022 B2 4/2017 Miyake et al.
9,754,540 B2 9/2017 Takesue et al.
9,854,629 B2 12/2017 Ikeda et al.
9,858,028 B2 1/2018 Ikeda et al.
9,940,086 B2 4/2018 Yoshizumi et al.
10,133,531 B2 11/2018 Yoshitani et al.
10,159,135 B2 12/2018 Ikeda et al.
10,182,210 B1 1/2019 Goetzinger, Jr.
10,332,859 B2 6/2019 Nakamura et al.
10,424,632 B2 9/2019 Nakamura
10,606,541 B2 3/2020 Yanagisawa et al.
10,719,284 B2 7/2020 Yamazaki et al.
10,871,669 B2 12/2020 Yamazaki et al.
10,885,877 B2 1/2021 Kurokawa
11,158,823 B2 10/2021 Nakamura et al.
11,372,276 B2 6/2022 Yamazaki et al.
11,380,218 B2 7/2022 Tsukamoto et al.
11,635,648 B2 4/2023 Yamazaki et al.
11,831,454 B2 * 11/2023 Schwitalla .......... H04L 12/1822
11,889,712 B2 1/2024 Kawano et al.
11,891,833 B2 * 2/2024 Fox ........................... E04H 3/24
D1,049,242 S * 10/2024 Rodriguez ................... D21/369
12,153,298 B2 11/2024 Yamazaki et al.
2002/0072139 A1 6/2002 Kashiwabara
2007/0069976 A1 * 3/2007 Willins ................... H04M 1/05 345/8
2009/0225001 A1 * 9/2009 Biocca ............... G02B 27/0172 345/8
2010/0208029 A1 * 8/2010 Marti .................... G06F 1/1601 348/14.02
2010/0238648 A1 * 9/2010 Tsukahara ......... G02F 1/133603 362/231
2011/0148290 A1 6/2011 Oota
2012/0032201 A1 * 2/2012 Chou ..................... H10K 59/18 257/40
2012/0256204 A1 10/2012 Yoshizumi et al.
2012/0273804 A1 11/2012 Hatano
2012/0276484 A1 11/2012 Izumi et al.
2013/0084531 A1 4/2013 Hamaguchi et al.
2013/0084664 A1 4/2013 Yoshitoku et al.
2013/0084666 A1 4/2013 Oshige
2013/0207946 A1 * 8/2013 Kim ......................... G09G 3/03 345/204
2013/0280839 A1 10/2013 Sonoda et al.
2013/0295705 A1 11/2013 Sonoda et al.
2014/0004640 A1 1/2014 Hamaguchi et al.
2014/0004642 A1 1/2014 Otsuka et al.
2014/0176856 A1 * 6/2014 Lee ....................... G02F 1/1335 349/139
2014/0307314 A1 10/2014 Yanagisawa et al.
2015/0060826 A1 3/2015 Matsumoto et al.
2015/0069360 A1 3/2015 Sato
2015/0076476 A1 3/2015 Odaka et al.
2015/0192731 A1 * 7/2015 Kim .................. G02F 1/133308 362/628
2016/0172595 A1 6/2016 Malinowski et al.
2016/0210103 A1 * 7/2016 Yoshizumi ........... H10K 77/111
2016/0299526 A1 * 10/2016 Inagaki ................. G06F 3/0443
2016/0315133 A1 10/2016 Sato
2016/0327987 A1 * 11/2016 Huitema .............. G04G 17/045
2016/0360625 A1 * 12/2016 Ogasawara ......... G02F 1/13452
2017/0041568 A1 * 2/2017 Rakshit ................. G06F 3/0346
2017/0052438 A1 * 2/2017 Decock .................. G03B 21/58
2017/0115489 A1 4/2017 Hu et al.
2017/0141167 A1 5/2017 Naganuma
2017/0256754 A1 9/2017 Defranco et al.
2017/0343827 A1 * 11/2017 Kokusho .................. H04N 9/77
2017/0358252 A1 * 12/2017 Bhageria ................. G06F 21/84
2018/0088455 A1 * 3/2018 Cippant ................. G03B 21/60
2018/0103840 A1 * 4/2018 Satgunam ................ A61B 3/18
2018/0190908 A1 7/2018 Ke et al.
2018/0375043 A1 * 12/2018 Jung ....................... B32B 15/08
2019/0026871 A1 1/2019 Han et al.
2019/0037184 A1 * 1/2019 Gauba .................. H04N 23/698
2019/0121515 A1 * 4/2019 Nashida ................ G06T 19/006
2019/0229296 A1 * 7/2019 Chen ...................... H10K 71/80
2019/0250332 A1 * 8/2019 Cippant ................... G02B 6/08
2019/0342632 A1 * 11/2019 DeFaria .................. G06T 15/20
2019/0371230 A1 * 12/2019 Zha .......................... G09G 3/32
2020/0035040 A1 * 1/2020 Eschricht ................ G06F 3/012
2020/0154076 A1 5/2020 Russell et al.
2020/0192557 A1 * 6/2020 Yi ....................... G06F 3/04815
2020/0203662 A1 6/2020 Mollard et al.
2020/0257156 A1 * 8/2020 Reeves ................. B32B 27/308
2020/0266368 A1 * 8/2020 Park ....................... H10K 59/40
2020/0326593 A1 * 10/2020 Gao .................. G02F 1/133606
2021/0080727 A1 * 3/2021 Yamada ................. G02B 30/22
2021/0110596 A1 * 4/2021 Ishikawa ................. G06F 3/011
2021/0271133 A1 * 9/2021 Zhang ............... G02F 1/133601
2021/0294198 A1 9/2021 Krauthamer
2022/0219065 A1 * 7/2022 Rankin .............. A63B 24/0021
2022/0344433 A1 * 10/2022 Leng .................... H10K 59/879
2022/0357591 A1 * 11/2022 Makinen .............. H04N 13/305
2022/0365394 A1 * 11/2022 Chen ................. G02F 1/133612
2023/0284479 A1 * 9/2023 Lee ........................... B32B 1/00
2023/0353163 A1 11/2023 Kanemura et al.
2023/0360572 A1 * 11/2023 Welck ................... G06F 3/1446
2023/0403881 A1 12/2023 Yamazaki et al.
2024/0188404 A1 6/2024 Yamazaki et al.
2024/0190441 A1 6/2024 Kubota et al.
2024/0346970 A1 * 10/2024 Welck ................... G06F 1/1601
2024/0377678 A1 * 11/2024 Sun ........................ H10K 59/10
2025/0076697 A1 3/2025 Yamazaki et al.
2025/0133933 A1 * 4/2025 Kim ..................... H10K 59/872

FOREIGN PATENT DOCUMENTS

CN 108474952 A 8/2018
CN 110770628 A 2/2020
EP 3779559 A 2/2021
JP 10-235011 A 9/1998
JP 2000-036385 A 2/2000
JP 2003-059663 A 2/2003
JP 2008-098106 A 4/2008
JP 2008-147072 A 6/2008
JP 2008-251270 A 10/2008
JP 2010-256534 A 11/2010
JP 2014-120218 A 6/2014
JP 2014-135251 A 7/2014
JP 2014-219671 A 11/2014
JP 2014-232568 A 12/2014
JP 2015-115178 A 6/2015
JP 2015-172616 A 10/2015

(56) References Cited

FOREIGN PATENT DOCUMENTS

| | | | |
|---|---|---|---|
| JP | 2016-197494 | A | 11/2016 |
| JP | 2019-500633 | | 1/2019 |
| JP | 2019-179696 | A | 10/2019 |
| JP | 2020-160305 | A | 10/2020 |
| JP | 2020-530971 | | 10/2020 |
| JP | 2021-157101 | A | 10/2021 |
| JP | 2021-182142 | A | 11/2021 |
| KR | 2014-0123420 | A | 10/2014 |
| KR | 2017-0082394 | A | 7/2017 |
| KR | 2018-0039734 | A | 4/2018 |
| WO | WO-2016/158080 | | 10/2016 |
| WO | WO-2017/074614 | | 5/2017 |
| WO | WO-2017/119788 | | 7/2017 |
| WO | WO-2018/087625 | | 5/2018 |
| WO | WO-2018/227424 | | 12/2018 |

OTHER PUBLICATIONS

Written Opinion (Application No. PCT/IB2022/061053) Dated Jan. 24, 2023.

Zakhidov.A et al., "Orthogonal processing: A new strategy for organic electronics", Chem. Sci. (Chemical Science), Apr. 7, 2011, vol. 2, No. 6, pp. 1178-1182.

Malinowski.P et al., "High resolution photolithography for direct view active matrix organic light-emitting diode augmented reality displays", J. Soc. Inf. Display (Journal of the Society for Information Display), Apr. 2, 2018, vol. 26, No. 3, pp. 128-136.

Malinowski.P et al., "Photolithographic patterning of organic photodetectors with a non-fluorinated photoresist system", Organic Electronics, Jul. 12, 2014, vol. 15, No. 10, pp. 2355-2359.

Malinowski.P et al., "Multicolor 1250 ppi OLED Arrays Patterened by Photolithography", SID Digest '16 : SID International Symposium Digest of Technical Papers, May 22, 2016, vol. 47, No. 1, pp. 1009-1012.

Papadopoulos.N et al., "AMOLED Displays with In-Pixel Photodetector", Liquid Crystals and Display Technology, Jul. 9, 2020, pp. 1-19.

Ke. T et al., "Technology Developments in High-Resolution FMM-free OLED and BEOL IGZO TFTs for Power-Efficient Microdisplays", SID Digest '21 : SID International Symposium Digest of Technical Papers, May 1, 2021, vol. 52, No. 1, pp. 127-130.

Malinowski.P et al., "Integration of additional functionalities into the frontplane of AMOLED displays", SID Digest '20 : SID International Symposium Digest of Technical Papers, Aug. 1, 2020, vol. 51, No. 1, pp. 646-649.

Malinowski.P et al., "Organic photolithography for displays with integrated fingerprint scanner", SID Digest '19 : SID International Symposium Digest of Technical Papers, May 29, 2019, vol. 50, No. 1, pp. 1007-1010.

Ke.T et al., "Island and Hole Fabrication on OLED Stack for High-Resolution Sensor in Display Application", IDW '20 : Proceedings of the 27th International Display Workshops, Dec. 9, 2020, vol. 27, pp. 902-905.

Gather.M et al., "Solution-Processed Full-Color Polymer-OLED Displays Fabricated by Direct Photolithography", SID Digest '06 : SID International Symposium Digest of Technical Papers, Jun. 1, 2006, vol. 37, No. 1, pp. 909-911.

Malinowski.P et al., "Photolithography as Enabler of AMOLED Displays Beyond 1000 ppi", SID Digest '17 : SID International Symposium Digest of Technical Papers, May 1, 2017, vol. 48, No. 1, pp. 623-626.

* cited by examiner

DISPLAY DEVICE

TECHNICAL FIELD

One embodiment of the present invention relates to a display device, a display module, and an electronic device. One embodiment of the present invention relates to a method for manufacturing a display device.

Note that one embodiment of the present invention is not limited to the above technical field. Examples of the technical field of one embodiment of the present invention include a semiconductor device, a display device, a light-emitting apparatus, a power storage device, a memory device, a lighting device, an input device (e.g., a touch sensor), an input/output device (e.g., a touch panel), a display module including any of these devices, an electronic device including the display module, a driving method thereof, and a manufacturing method thereof.

BACKGROUND ART

Recent display devices have been expected to be applied to a variety of uses. Usage examples of large-sized display devices include a television device for home use (also referred to as TV or television receiver), digital signage, and a PID (Public Information Display). In addition, a smartphone and a tablet terminal including a touch panel are being developed as portable information terminals.

Furthermore, display devices have been required to have higher resolution. As devices requiring high resolution display devices, for example, devices for virtual reality (VR), augmented reality (AR), substitutional reality (SR), or mixed reality (MR) have been actively developed.

Display devices that include light-emitting devices (also referred to as light-emitting elements) have been developed as display devices, for example. Light-emitting devices (also referred to as EL devices or EL elements) utilizing an electroluminescence (hereinafter referred to as EL) phenomenon have features such as ease of reduction in thickness and weight, high-speed response to input signals, and driving with a constant DC voltage power source, and have been used in display devices.

Patent Document 1 discloses a display device for VR that includes an organic EL device (also referred to as organic EL element).

REFERENCE

Patent Document

[Patent Document 1] PCT International Publication No. 2018/087625

SUMMARY OF THE INVENTION

Problems to be Solved by the Invention

An object is to provide a display device providing a wider visual field or visible range than a conventional head mounted display. A projection head mounted display includes a complicated optical system, and has a disadvantage in that it takes a lot of cost to design and manufacture the optical system. Thus, an object is to achieve high definition and a large screen with the use of a direct-view image display device including a small number of optical systems or no optical system. Another object is to achieve an image display device providing the sense of immersion.

Another object is to achieve an imaging device that generates a digital image making the shape of a user's head in a three-dimensional space by combining imaging devices. Another object is to provide a data analysis system based on an image of a user or a driver.

Another object is to display an optimal image for a user with the use of a gaze detection sensor.

Another object is to provide a data analysis system based on images of surroundings of a user or surroundings of a driver.

Another object is to provide an information processing system that provides the situation of surroundings of a user or surroundings of a driver as appropriate.

Another object is to achieve an image display device with which various kinds of settings can be controlled at the time of displaying a display image of driving simulation, an entertainment attraction, or a game.

Means for Solving the Problems

A display device of the present invention is a display device placed at least on the front side of a user's visual field. The display device uses a flexible film, has a curved surface, and has a display surface on the user's side of the display device.

As a specific example, FIG. 1(A) illustrates a schematic view of a display device having a curved surface. FIG. 1(A) is an example of a display device 61G including a display region with a curved band shape, which is provided on the front side of a user's head 60H, and FIG. 1(B) illustrates an example of a front display image.

A switching element or a light-emitting element is provided over the flexible film, so that a flexible display is formed. In the above structure, at least part of the display surface has a curved shape, specifically a band shape, a cylindrical shape, or a hemispherical shape. When at least part of the display surface has a band shape, a cylindrical shape, or a hemispherical shape, the display surface can be placed at least on the front side of the head. The display device can be achieved using a device fixed to a user's nose or ear. Furthermore, by combining flexible displays, they can be placed not only on the front side of the head but also on the side surface of the head, on the upper side of the head, or on the rear side of the head.

In the case where flexible displays are placed on the side surface of the head, on the upper side of the head, or on the rear side of the head, the display device is not limited to a device fixed to the user's nose or ear, and the flexible displays, i.e., large-area display screens are placed to surround the user's head, so that a wide visual field or visible range is obtained.

Display is performed inside a space on the user's side of the display device, and the rear surface of the display device is placed on the side opposite to the user's side of the display device. The user's side of the display device may be provided with a large display region, or a see-through display region of the display device may display only some marks. For example, in the see-through region, an image illustrated in FIG. 1(B) may be an outside view as it is and only a luminous arrow mark 62 may be displayed.

It is also possible to employ a structure in which a first sensor portion that senses the user's head is provided on the user's side of the display device, and an imaging device that generates a digital image making the shape of the user's head in a three-dimensional space can be achieved. Wide-range image display is performed on the basis of imaging data obtained by the sensor portion provided on the user's side of the display device, so that a circuit for generating image data for the image display is preferably provided.

It is also possible to provide a second sensor portion that senses information on the rear surface side of the display device, i.e., the outer side of the display device. In the case of providing an imaging element, an outside view can be displayed on an inside display screen.

For example, a display having a curved surface is placed to surround a head, and the state of surroundings of a user (a region outside the display) can be displayed on the display having a curved surface.

For example, a structure may be employed in which a curved display surface is provided on the inner side of the display device to surround a user's head as a center, and no display surface is provided on the outer side of the display device. The second sensor portion for capturing images of surroundings is not necessarily provided on the outer side of the display device.

The display device may be configured to include an audio output portion that outputs audio information.

Although a large-area display screen is placed, the display quality of a region not attracting user's attention may be decreased to reduce a load on the circuit for generating image data. For example, with the use of the first sensor portion on the inner side of the display device that senses a user's gaze position, display on the screen may be adjusted using foveated rendering.

In the foveated rendering, for example, a user's gaze is sensed, and the level of display quality is partly changed so that a high-quality image is displayed in a region where the user's gaze is likely to be concentrated and a low-quality image is displayed in a surrounding region. Rendering by selectively changing the image quality on the basis of the gaze is also referred to as a foveated rendering method.

The display having a curved surface preferably has high resolution, and preferably has an extremely high definition such as HD (number of pixels: 1280×720), FHD (number of pixels: 1920×1080), WQHD (number of pixels: 2560×1440), WQXGA (number of pixels: 2560×1600), 4K (number of pixels: 3840×2160), or 8K (number of pixels: 7680×4320). In particular, a definition of 4K, 8K, or higher is preferable. The pixel density (resolution) of the display device of one embodiment of the present invention is preferably 100 ppi or higher, further preferably 300 ppi or higher, further preferably 500 ppi or higher, further preferably 1000 ppi or higher, still further preferably 2000 ppi or higher, still further preferably 3000 ppi or higher, still further preferably 5000 ppi or higher, yet further preferably 7000 ppi or higher. With the use of such a display device with one or both of high definition and high resolution, the electronic device can have higher realistic sensation and sense of depth in personal use such as portable use and home use. There is no particular limitation on the screen ratio (aspect ratio) of the display device of one embodiment of the present invention. For example, the appropriately designed display device is compatible with a variety of screen ratios such as 1:1 (a square), 4:3, 16:9, and 16:10.

Note that in this specification, a device formed using a metal mask or an FMM (fine metal mask, high-resolution metal mask) may be referred to as a device having an MM (metal mask) structure. In this specification, a device formed without using a metal mask or an FMM may be referred to as a device having an MML (metal maskless) structure.

In this specification, a structure in which light-emitting layers in light-emitting devices of different colors (here, blue (B), green (G), and red (R)) are separately formed or separately patterned may be referred to as an SBS (Side By Side) structure. The SBS structure allows optimization of materials and structures of light-emitting devices and thus can extend freedom of choice of the materials and the structures, which makes it easy to improve the luminance and the reliability.

In this specification, a light-emitting device capable of emitting white light may be referred to as a white light-emitting device. Note that a combination of white light-emitting devices with coloring layers (e.g., color filters) enables a full-color display device.

Light-emitting devices can be classified roughly into a single structure and a tandem structure. A device having a single structure includes one light-emitting unit between a pair of electrodes, and the light-emitting unit preferably includes one or more light-emitting layers. When white light emission is obtained using two light-emitting layers, two light-emitting layers are selected such that emission colors of the two light-emitting layers are complementary colors. For example, when the emission color of a first light-emitting layer and the emission color of a second light-emitting layer have a relationship of complementary colors, it is possible to obtain a structure where the light-emitting device emits white light as a whole. Furthermore, in the case where white light emission is obtained using three or more light-emitting layers, the light-emitting device is configured to be able to emit white light as a whole by combining the emission colors of the three or more light-emitting layers.

A device having a tandem structure includes two or more light-emitting units between a pair of electrodes, and each light-emitting unit preferably includes one or more light-emitting layers. To obtain white light emission, the structure is made so that light from light-emitting layers of the plurality of light-emitting units can be combined to be white light. Note that a structure for obtaining white light emission is similar to the structure in the case of a single structure. Note that in the device having a tandem structure, it is suitable to provide an intermediate layer typified by a charge-generation layer between a plurality of light-emitting units.

When the above white light-emitting device (having a single structure or a tandem structure) and the above light-emitting device having an SBS structure are compared with each other, the light-emitting device having an SBS structure can have lower power consumption than the white light-emitting device. To reduce power consumption, the light-emitting device having an SBS structure is suitably used. Meanwhile, the white light-emitting device is suitable in terms of lower manufacturing cost or higher manufacturing yield because the manufacturing process of the white light-emitting device is simpler than that of the light-emitting device having an SBS structure.

In the display device of this embodiment, the distance between light-emitting devices can be short. Specifically, the distance between the light-emitting devices, the distance between EL layers, or the distance between pixel electrodes can be less than 10 μm, less than or equal to 5 μm, less than or equal to 3 μm, less than or equal to 2 μm, less than or equal to 1 μm, less than or equal to 500 nm, less than or equal to 200 nm, less than or equal to 100 nm, less than or equal to 90 nm, less than or equal to 70 nm, less than or equal to 50 nm, less than or equal to 30 nm, less than or equal to 20 nm, less than or equal to 15 nm, or less than or equal to 10 nm. In other words, the display device includes a region where the distance between the side surface of a first organic layer 112R and the side surface of a second organic layer 112G or the distance between the side surface of the second organic layer 112G and the side surface of a third organic layer 112B is less than or equal to 1 μm, preferably less than or equal to 0.5 μm (500 nm), further preferably less than or equal to 100 nm.

Effect of the Invention

High definition and a large screen can be achieved with the use of a direct-view image display device. A personal image display device providing the sense of immersion can be achieved.

An imaging device that generates a digital image making the shape of a user's head in a three-dimensional space can be achieved by combining imaging devices. A data analysis system based on an image of a user or a driver can also be provided.

With the use of a gaze detection sensor, an optimal image for a user can be displayed by a foveated rendering method.

A data analysis system based on images of surroundings of a user or surroundings of a driver can be provided. With the use of the first sensor portion, a three-dimensional model of a user's head can be formed.

An information processing system that provides the situation of surroundings of a user or surroundings of a driver as appropriate can be provided.

An image display device with which various kinds of settings can be controlled at the time of displaying a display image of driving simulation, an entertainment attraction, or a game can be achieved.

MODE FOR CARRYING OUT THE INVENTION

Figure 1A:
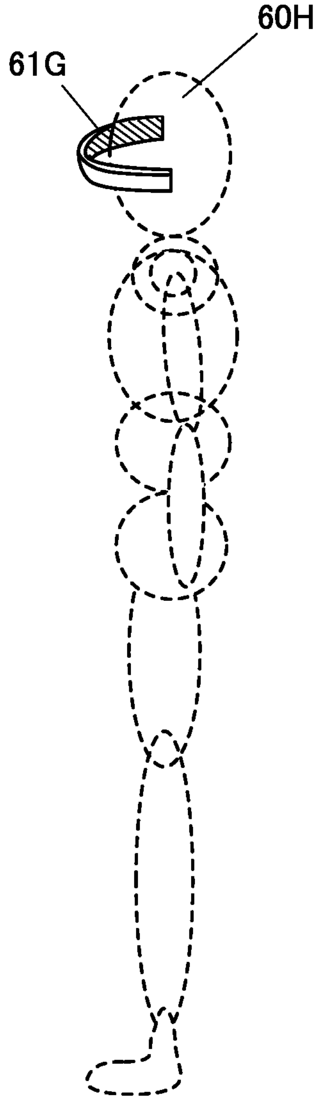
FIG. 1A is a schematic view illustrating a positional relationship between a display device illustrating one embodiment of the present invention and a user.

Embodiments are described below with reference to the drawings. Note that the embodiments can be implemented with many different modes, and it will be readily understood by those skilled in the art that modes and details thereof can be changed in various ways without departing from the spirit and scope thereof. Thus, the present invention should not be interpreted as being limited to the following description of the embodiments.

Note that in structures of the invention described below, the same portions or portions having similar functions are denoted by the same reference numerals in different drawings, and description thereof is not repeated. Furthermore, the same hatch pattern is used for the portions having similar functions, and the portions are not especially denoted by reference numerals in some cases.

Note that in each drawing described in this specification, the size, the layer thickness, or the region of each component is exaggerated for clarity in some cases. Therefore, they are not limited to the illustrated scale.

Note that ordinal numbers such as "first" and "second" in this specification are used in order to avoid confusion among components and do not limit the number of components.

Embodiment 1

Figure 1B:
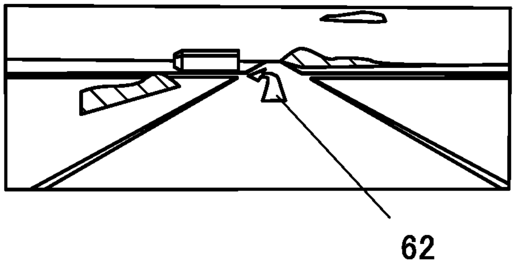
FIG. 1B is a diagram illustrating an example of a display image displayed on the front side.

FIG. 1A is an example of the display device 61G including a display region with a curved band shape, which is provided on the front side of the user's head 60H, and FIG. 1B illustrates an example of a front display image. In this example, the display device 61G is lightweight and includes a display region with a curved band shape obtained by using a flexible film and changing the shape of one rectangular display panel.

Figure 2A:
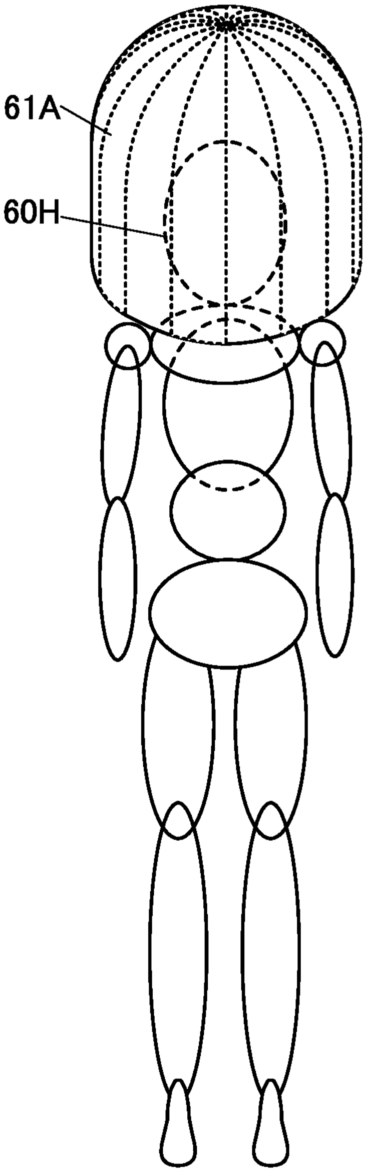
FIG. 2A is a schematic view illustrating a positional relationship between a display device illustrating one embodiment of the present invention and a user.

FIG. 2A illustrates an example of a display device including a larger display region than the display device 61G in FIG. 1A. FIG. 2A illustrates an example in which the user's head 60H is provided with a display device 61A having an appearance which is a dome shape and is also referred to as a combined shape of a hemisphere and a circular cylinder. The display device 61A has a hollow on the inner side, and the user's head 60H can be placed in this portion. A display surface, i.e., a display region 63 is on the inner side of the display device 61A, i.e., the user's side, and when an image is displayed, a large area of a user's visual field is covered with the display surface and occupied by an image display region.

Since the display device 61A has the hollow on the inner side, the user can move his/her neck and can move the head 60H left, right, up, and down. Since the display device 61A has the hollow on the inner side, the display device can be seen with glasses, and since the display device 61A does not need to be fixed to the head 60H, there is no weight load of the display device on the head 60H. As needed, an optical system may be provided to adjust the distance between a user's eye and the display region 63. The distance between the user's eye and the display region 63 is preferably greater than or equal to 80 mm, and in the case where the distance is less than 80 mm, an image is out of focus and thus it is preferable to wear dedicated glasses for focusing.

As long as the display device 61A can be provided so as to cover the user's head 60H, there is no particular limitation on a provision method; for example, the display device 61A is fixed to the upper half of the body of a user standing or sitting, or the display device 61A is used while being suspended above a user. Another provision method may be employed in which the display device 61A covers the head 60H of a user lying on a stand and part of the user's head 60H is in contact with part of the inner side of the display device 61A so that the user sees image display while lying. Alternatively, for amusement application, the display device is fixed to a movable arm and moved so that the display device covers the user's head. Alternatively, for example, for training application, a movable arm may be fixed to a training device such as a treadmill, and the display device may be in contact with and cover the head of a user exercising.

Figure 2B:
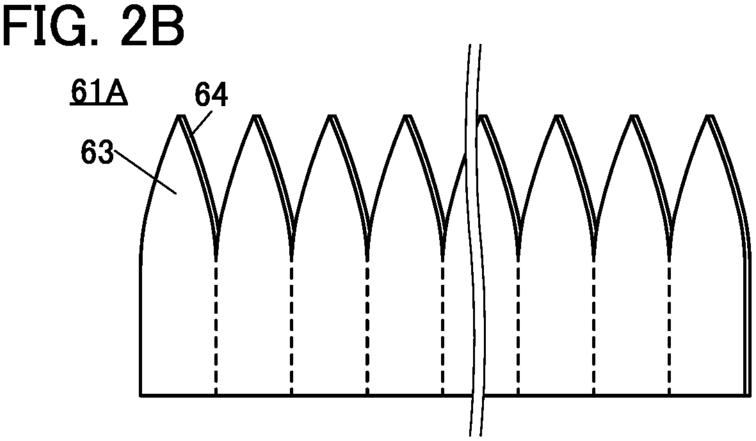
FIG. 2B is a development view of the display device.

FIG. 2B illustrates an example of a development view of a display panel used for the display device 61A. The display panel includes the display region 63 and a non-display region 64. The display region 63 is provided with a plurality of pixels (organic EL elements or LED elements) arranged in a matrix. For example, an active matrix display device is manufactured using a flexible substrate. The non-display region 64 is provided with one or more of a wiring, a terminal, an electrode, and a driver circuit (a gate driver or a source driver). An IC chip or an FPC (Flexible Printed Circuit) may be mounted on the non-display region.

As illustrated in FIG. 2B, an image display region with a dome shape surrounding the user's head 60H may be achieved by using a flexible film and changing the shape of one large display panel.

Although FIG. 2B illustrates an example in which the shape of one large display panel is changed, an image display region surrounding the user's head 60H may be achieved by bonding a plurality of display panels to each other so that a non-display region of one display panel and a display region of another display panel overlap with each other. When the plurality of display panels are bonded to each other to partly overlap with each other, the width of a seam can be reduced and the seam can be less likely to be seen.

Figure 2C:
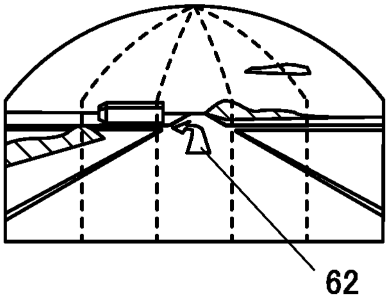
FIG. 2C is a diagram illustrating part of a display image displayed on the front side.
Figure 2D:
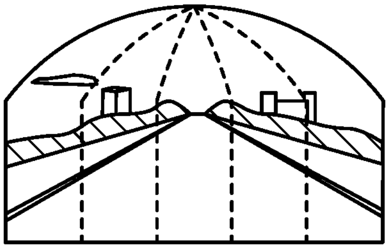
FIG. 2D is a diagram illustrating part of a display image displayed on the rear side.

FIG. 2C illustrates an example of a display image displayed on the user's front side corresponding to a region which is half of a display region displayed on the inner side of the display device 61A. FIG. 2D illustrates an example of a display image displayed on the user's rear side corresponding to a region which is the other half of the display region displayed on the inner side of the display device 61A.

The display images illustrated in FIG. 1B and FIG. 2C are each displayed as an image which is captured by an imaging camera and includes the arrow mark 62. There is no limitation on the arrow mark 62, and text information or guidelines may be added to edit the display image.

In the case where the display device 61A is provided to be capable of covering the user's head 60H, in order to adjust a difference in level between eyes or brightness between surrounding environments, a touch input portion may be provided in a display region displayed for the user's eye on the user's side, i.e., the inner side of the display device 61A. That is, a display panel enabling touch input may be provided. A touch input portion can also be regarded as a kind of the first sensor portion. When the space between the user's eye and the display region 63 is wide enough for the user's hand to put therein, the user can perform image adjustment by himself/herself in the display region displayed on the inner side of the display device 61A. The image adjustment includes adjustment of eye level or luminance or adjustment of chromaticity.

Furthermore, in order to avoid the sense of uncomfortable immediately after the display device 61A is provided to be capable of covering the user's head 60H, the second sensor portion may be provided on the side opposite to the user's side, i.e., the outer side of the display device 61A and images of surroundings may be displayed. In such a manner, images of user's surroundings are hardly changed before and after the user's head 60H is provided with the display device 61A and thus the user has the sense of security, and the appearances of the images can be adjusted. These are effective in the case where the display device 61A is used as part of an attraction of an amusement park. Before the attraction, the display device 61A is set on the head 60H and display images are gradually changed from images of real surroundings to images of unreal space, which reflect attraction contents, so that the sense of immersion can be provided. In order to sense visually induced motion sickness of the user or disorder of the user, a gaze sensing camera or a body temperature measurement sensor may be provided as the first sensor portion on the inner side of the display device 61A. In the case where the user wants to stop the attraction, the user can make an emergency stop by performing touch input on the inside display panel, and with the use of a motion sensor as the second sensor portion on the outer side of the display device 61A, an emergency stop can be made when the movement of a hand is sensed; thus, a safe attraction device can be provided.

The display device of one embodiment of the present invention can be used not only for an attraction but also for a large-sized body feeling game machine.

Furthermore, the display device 61A can be provided for a training machine to be used by a user.

In the case of taking a walk, a run, or a bike ride actually outdoors, exercising at one's own pace is impossible in many cases due to a pedestrian, a car, and a signal. There is also possibility of occurrence of a traffic accident and change in the weather, which hinders exercise. Indoor training machines do not have such problems; however, taking a run only in an indoor view cannot provide the sense of running speed, which is boring and easily causes lack of longevity.

As illustrated in FIG. 2C, by displaying not only a linear course but also the arrow mark 62 on a crossing, a sudden change in an image can be notified to a user in advance, and visually induced motion sickness can also be suppressed.

In the case of a conventional head-mounted display, it is difficult to exercise successively while the head-mounted display is worn because of the weight on a neck. Moreover, in the case of a conventional head-mounted display, only a slight movement of a neck rapidly changes an image on the basis of an acceleration sensor, which easily causes visually induced motion sickness. Meanwhile, the display device 61A has a hollow, and even when a neck is moved left and right, an image is already displayed in a direction where the neck is moved; thus, a change in an image can be suppressed.

Furthermore, the display device 61A may include an imaging element as the first sensor portion on the inner side to have an automatic stop function for making an emergency stop when facial expression or facial abnormality is sensed.

Figure 3A:
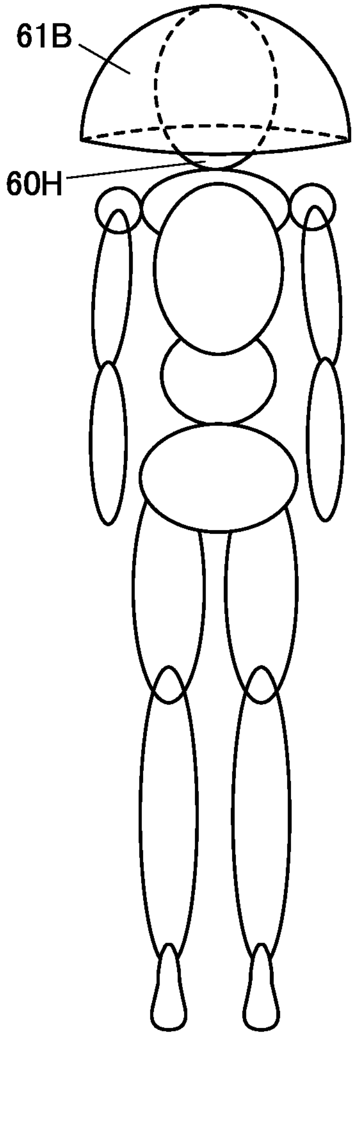
FIG. 3A is a schematic view illustrating a positional relationship between a display device illustrating one embodiment of the present invention and a user.
Figure 3B:
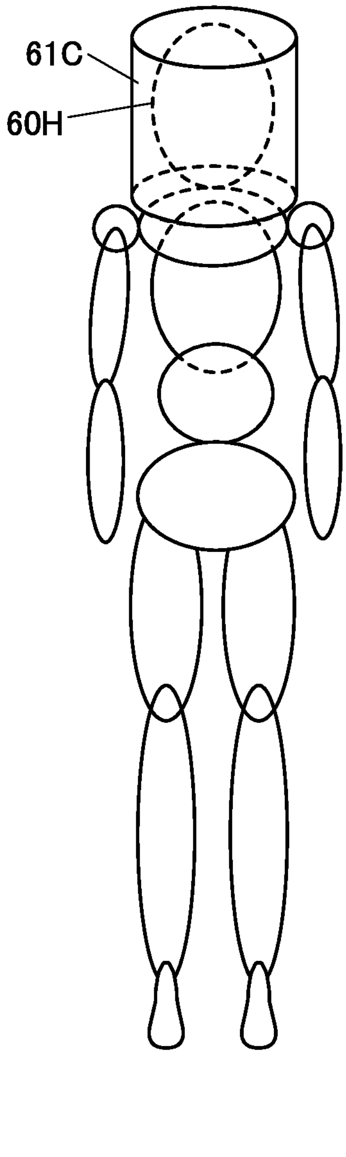
FIG. 3B is a variation thereof.

Without limitation to the shape of the display device 61A, a hemispherical shape (also referred to as a hemisphere shape) illustrated in FIG. 3A or a cylindrical shape (also referred to as a cylinder shape) illustrated in FIG. 3B may be employed.

In FIG. 3A, a display device 61B has a shape not covering part of the user's head 60H and the periphery of the user's mouth is open; thus, the user's voice can be carried without being maffled. The display device 61B can also be lightweight. A flexible display is lightweight, and can be configured not to make the user feel heavy even when fixed to the top of the user's head, as long as an optical system is not provided.

In FIG. 3B, a display device 61C has a cylindrical shape and thus is easy to design compared with another structure including a hemisphere in its part, and can be formed by rolling one flexible display up into a cylindrical shape and combining it with another flat circular display above the top of the head.

Figure 4A:
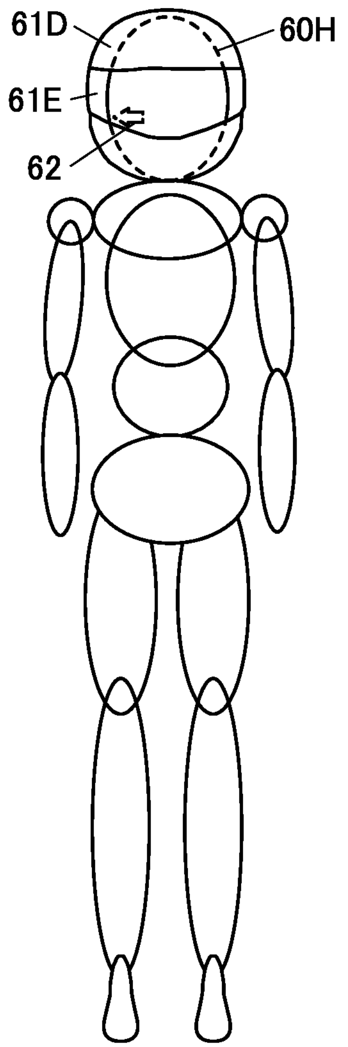
FIG. 4A is a schematic view illustrating a positional relationship between a display device illustrating one embodiment of the present invention and a user.
Figure 4B:
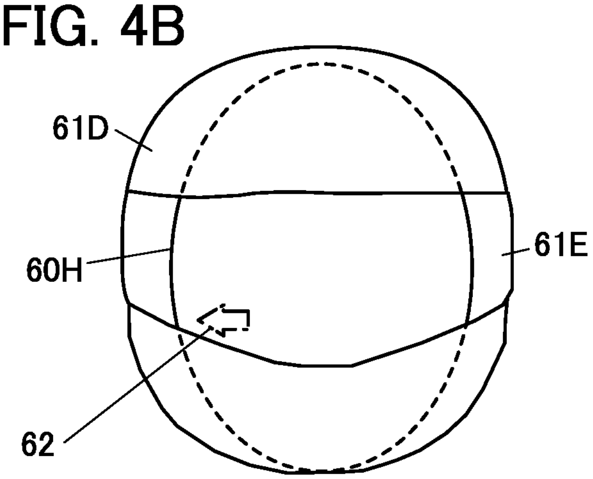
FIG. 4B is an enlarged view of a head in FIG. 4A.
Figure 4C:
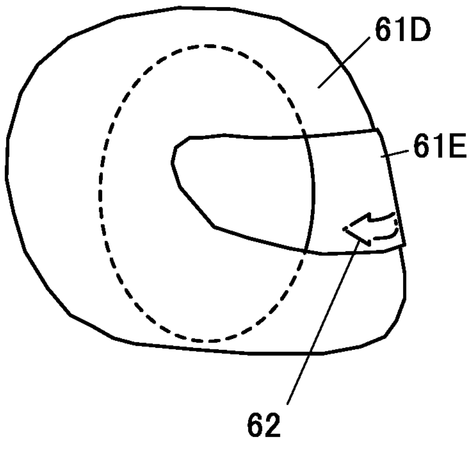
FIG. 4C is a side view thereof.

Alternatively, a helmet display device illustrated in FIG. 4A may be used. FIG. 4B illustrates a front view, and FIG. 4C illustrates a side view.

Note that the display device of this example has an appearance of a helmet, and employs a combination of a display device 61D including a display region on the inner side and a see-through display device 61E that can display an image on a window through which the outside is seen. A flexible display is fixed to a curved surface of a light-transmitting member of the see-through display device 61E, and a user can see outer surroundings.

When running on a motorcycle, a user is supplied with information from the display region of the display device 61D including the display region on the inner side, and the simple arrow mark 62 is displayed on the see-through display device 61E, whereby a running assist function is provided. When the motorcycle is stopped, the see-through display device 61E can also display map information. With the use of such a helmet display device illustrated in FIG. 4, a driver can be guided by a navigation system even in bad weather, for example, rainy weather. A conventional navigation device mounted on a motorcycle has disadvantages in that, in driving, the navigation device cannot be seen without shifting one's gaze and cannot be operated because both hands take a steering wheel. The helmet display device illustrated in FIG. 4A may be mounted with a microphone for audio input as the first sensor portion on the inner side so as to enable audio operation, or may include a gaze sensing sensor as the first sensor portion so as to enable gaze input operation.

When the second sensor portion that captures an image of the rear side is provided on the outer side of the helmet display device, an image of the rear side can be displayed on part of the display region on the inner side of the helmet.

The helmet display device can be provided on the head 60H of a user who rides a two-wheeled vehicle typified by a motorcycle or an automobile. In addition, the helmet display device can be provided on the head 60H of a user who works in a dangerous workplace. The helmet display device includes the display region on the inner side of a shell portion formed of a material which is strong enough to protect the head 60H.

As described above, usage methods in various scenes can be assumed, and with the use of the display device, an image display device with which various kinds of settings can be controlled at the time of displaying a display image of driving simulation, an entertainment attraction, or a game can be achieved.

An information processing system that provides the situation of surroundings of a user or surroundings of a driver as appropriate can be provided.

A data analysis system based on images of surroundings of a user or surroundings of a driver can be provided.

Embodiment 2

In this embodiment, an example of an information processing system that includes a display device and provides the situation of surroundings of a user or surroundings of a driver as appropriate is described below.

Figure 5A:
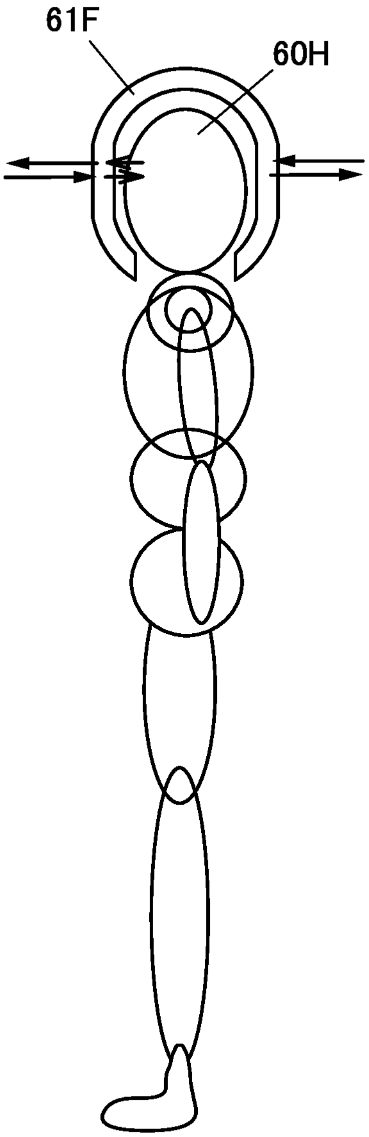
FIG. 5A is a schematic view illustrating a positional relationship between a display device illustrating one embodiment of the present invention and a user.

FIG. 5A illustrates a side view of an arched display device 61F provided to cover the user's head 60H.

As long as the display device 61F can be provided so as to cover the user's head 60H, there is no particular limitation on a provision method; for example, the display device 61F is fixed to the upper half of the body of a user standing or sitting, or the display device 61F is used while being suspended above a user. Another provision method may be employed in which the display device 61F covers the head 60H of a user lying on a stand and part of the user's head 60H is in contact with part of the inner side of the display device 61F so that the user sees image display while lying. Alternatively, for amusement application, the display device is fixed to a movable arm and moved so as to cover the user's head.

The display device 61F includes an image processing circuit therein, and includes a display region and the first sensor portion on the user's side. The display device 61F includes the second sensor portion that captures an image of the front side and a third sensor portion that captures an image of the rear side.

Figure 5B:
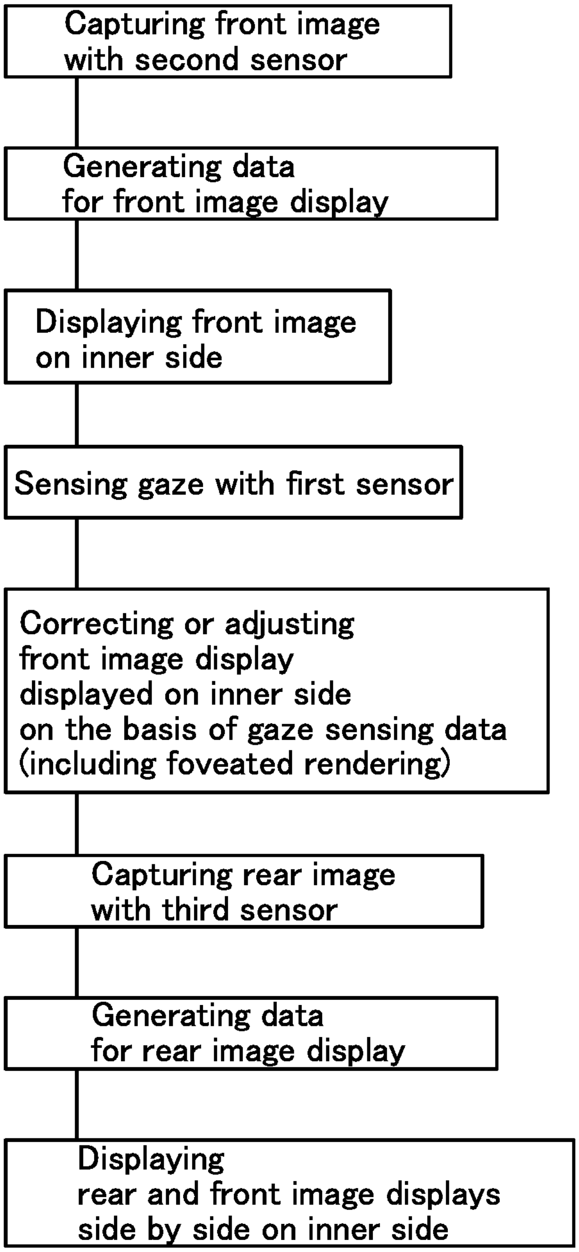
FIG. 5B is an example of a flow chart of display by the display device illustrating one embodiment of the present invention.

FIG. 5B shows an example of a flow chart of display by the display device 61F.

First, the second sensor portion that captures an image of the front side of the display device 61F captures an image of the front side, and in order to perform display on the display region on the basis of obtained data, data for front image display is generated using the image processing circuit.

The obtained data is displayed on the display region on the inner side of the display device 61F. At this stage, a front image is displayed on the inner side of the display device.

When a user see the displayed front image, gaze sensing is performed by the first sensor portion provided on the inner side of the display device 61F.

Next, on the basis of gaze sensing data, the front image display displayed on the inner side of the display device 61F is corrected or adjusted (including foveated rendering).

The scale of the display image may be adjusted on the basis of the gaze sensing data.

On the basis of the above flow, with the use of a gaze detection sensor, an optimal image for a user can be displayed.

Moreover, a third sensor that captures an image of the rear side of the display device 61F captures an image of the rear side, and in order to perform display on the display region on the basis of obtained data, data for rear image display is generated using the image processing circuit.

Next, the front image display and the rear image display are displayed side by side on the inner side of the display device 61F. As a result, a front image display area and a rear image display area are displayed side by side.

In gaze sensing by the first sensor portion, when the user focuses on the rear image display area, the rear image display area is made to perform high-resolution display, and the front image display area is made to have low resolution.

When the user focuses on the front image display area, the front image display area is made to perform high-resolution display, and the rear image display area is made to have low resolution. By lowering the resolution of an area other than the display area that is focused on, power saving can also be achieved.

In the example in FIG. 5A, one flexible display is curved in a U-like shape and both side surfaces are open; alternatively, additional flexible displays may be combined with the both side surfaces so that the user is surrounded by the flexible displays on all sides.

With the first sensor portions provided on all sides, an imaging device that generates a digital image making the shape of the user's head 60H in a three-dimensional space can also be achieved. A data analysis system based on detailed 3D image data of the head 60H of a user or a driver can also be provided.

Figure 6:
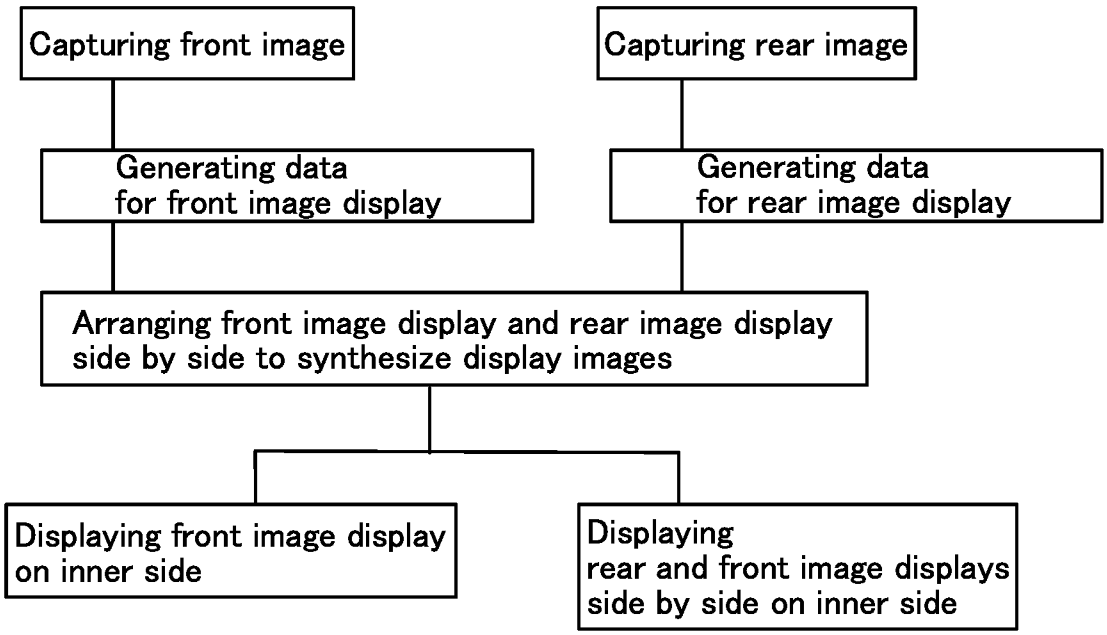
FIG. 6 is an example of a flow chart of display by a display device illustrating one embodiment of the present invention.

FIG. 6 shows another example of a flow chart of display by the display device 61F.

First, the second sensor portion that captures an image of the front side of the display device 61F captures an image of the front side, the third sensor that captures an image of the rear side of the display device 61F captures an image of the rear side, and data for each side is generated.

After that, with the use of the image processing circuit, front image display and rear image display are arranged side by side to synthesize display images. In the case where an attachment position or performance is different between the second sensor portion and the third sensor portion, with the use of the image processing circuit, front image display and rear image display are arranged side by side so that surrounding landscapes are level with each other, whereby a 360-degree panoramic composite image is generated. Accordingly, an omnidirectional display image can also be displayed on the inner side of the display device 61F.

According to user's request, front image display is displayed on the inner side of the display device 61F. Alternatively, according to user's request, a 360-degree panoramic image generated by arranging front image display and rear image display side by side can be displayed. Therefore, as the display region of the display device 61F, the display region is provided around the user, so that the user can have the sense of immersion.

Without limitation to the display device 61F, this embodiment can be employed for the display devices 61A, 61B, 61C, 61D, 61E, and 61G described in Embodiment 1.

This embodiment can be freely combined with the other embodiments.

Embodiment 3

Figure 7A:
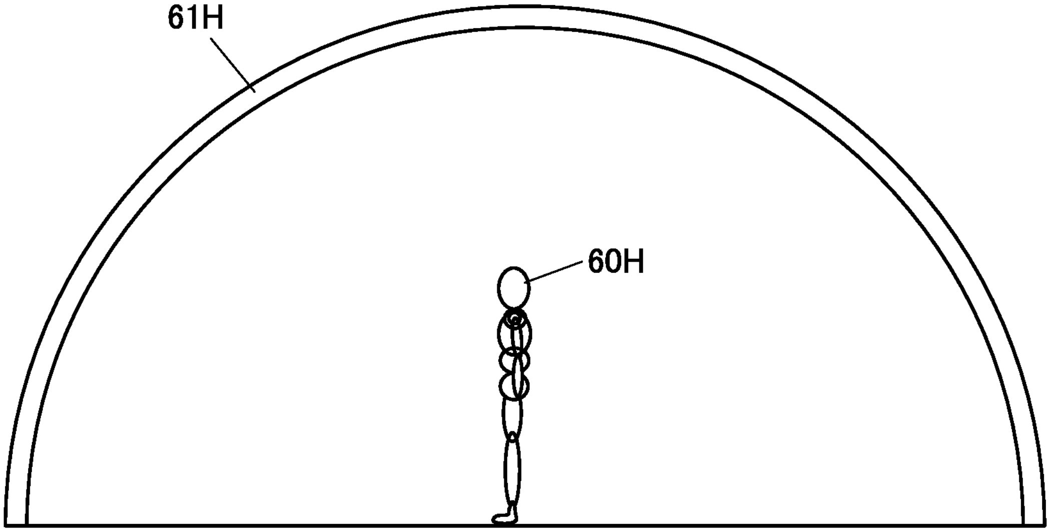
FIG. 7A and FIG. 7B are schematic views each illustrating a positional relationship between a display device illustrating one embodiment of the present invention and a user.

In this embodiment, FIG. 7A illustrates an example of a schematic cross-sectional view of a large-sized display device 61H. The large-sized display device 61H is used in a large-scale park typified by amusement facilities, and the large-sized display device 61H is configured to be capable of taking a large number of people therein. The large-sized display device 61H can be applied to a planetarium, for example. FIG. 7A illustrates an example of one user. The large-sized display device 61H includes a hemispherical display region, and even when the user moves or changes direction, the display region of the display device 61H is provided on the front side of the user's head 60H.

The display region of the display device 61H has a structure in which flexible displays having curved surfaces are combined with each other so that the user is surrounded by the flexible displays on all sides. Therefore, as the display region of the display device 61H, the display region is provided around the user, so that the user can have the sense of immersion.

Figure 7B:
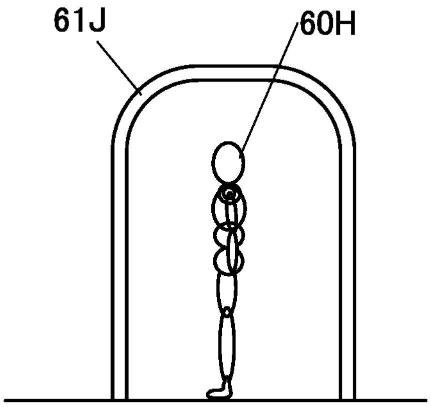

Without limitation to a hemispherical shape whose entire surface is curved, a display device 61J may be used in which a closed space composed of a flat surface and a curved surface is used as an inner space as illustrated in FIG. 7B. In this structure, a flexible display and a flat display are combined with each other on the all sides around the user. FIG. 7B is a schematic cross-sectional view of the display device 61J.

The display device 61J includes a display region having a U-shaped cross section, and even when the user moves or changes direction, the display region of the display device 61J is provided on the front side of the user's head 60H. Therefore, as the display region of the display device 61J, the display region is provided around the user, so that the user can have the sense of immersion.

In FIG. 7B, the display device 61J of a simulation device or a game device used in play facilities or experiential facilities is configured to be capable of taking one person or several people therein.

An entrance to the inside of the display device 61H or the display device 61J is an entrance that can be opened and closed. When this portion is also provided with a display region, the entire surface can be used as a region, but a structure is also possible in which only a doorway is not a display region so as to serve as an emergency exit. Alternatively, an entrance to the inside of the display device 61H or the display device 61J may be provided underfoot so that a person can move from below the display device 61H or the display device 61J with the use of external stairs or an external tunnel.

This embodiment can be freely combined with the other embodiments.

Embodiment 4

In this embodiment, structure examples of a display device that can employ one embodiment of the present invention will be described. A display device described below as an example can be employed for any one of the display devices 61A, 61B, 61C, 61D, 61E, 61F, 61G, 61H, and 61J in Embodiment 1, Embodiment 2, and Embodiment 3.

One embodiment of the present invention is a display device including a light-emitting element (also referred to as a light-emitting device). The display device includes two or more light-emitting elements that emit light of different colors. The light-emitting elements each include a pair of electrodes and an EL layer therebetween. The light-emitting elements are preferably organic EL elements (organic electroluminescent elements). The two or more light-emitting elements that emit light of different colors include EL layers containing different light-emitting materials. For example, when three kinds of light-emitting elements that emit red (R), green (G), and blue (B) light are included, a full-color display device can be achieved.

In the case of manufacturing a display device including a plurality of light-emitting elements of different emission colors, layers (light-emitting layers) containing at least light-emitting materials of different emission colors each need to be formed in an island shape. In the case of separately forming part or the whole of EL layer, a method for forming an island-shaped organic film by an evaporation method using a shadow mask such as a metal mask is known. However, this method causes a deviation from the designed shape and position of the island-shaped organic film due to various influences such as the accuracy of the metal mask, the positional deviation between the metal mask and a substrate, a warp of the metal mask, and expansion of the outline of a deposited film due to vapor scattering, for example; accordingly, it is difficult to achieve the high resolution and high aperture ratio of the display device. In addition, the outline of the layer might blur during evaporation, so that the thickness of an end portion might be reduced. That is, the thickness of an island-shaped light-emitting layer might vary from place to place. In addition, in the case of manufacturing a display device with a large size, high definition, or high resolution, a manufacturing yield might be reduced because of low dimensional accuracy of the metal mask and deformation due to heat or the like. Thus, a measure has been taken for a pseudo increase in resolution (also referred to as pixel density) by employing a unique pixel arrangement such as a PenTile arrangement.

Note that in this specification, the term "island shape" refers to a state where two or more layers formed using the same material in the same step are physically separated from each other. For example, the term "island-shaped light-emitting layer" refers to a state where the light-emitting layer and its adjacent light-emitting layer are physically separated from each other.

In one embodiment of the present invention, fine patterning of EL layers is performed by photolithography without using a shadow mask such as a fine metal mask (an FMM). Accordingly, it is possible to achieve a display device with high resolution and a high aperture ratio, which has been difficult to achieve. Moreover, since the EL layers can be formed separately, it is possible to achieve a display device that performs extremely clear display with high contrast and high display quality. Note that, fine patterning of the EL layers may be performed using both a metal mask and photolithography, for example.

In addition, part or the whole of the EL layer can be physically partitioned. This can inhibit leakage current flowing between adjacent light-emitting elements through a layer (also referred to as a common layer) shared by the light-emitting elements. Thus, it is possible to prevent crosstalk due to unintended light emission, so that a display device with extremely high contrast can be achieved. In particular, a display device having high current efficiency at low luminance can be achieved.

In one embodiment of the present invention, the display device can be also obtained by combining a light-emitting element that emits white light with a color filter. In that case, light-emitting elements having the same structure can be employed as light-emitting elements provided in pixels (subpixels) that emit light of different colors, which allows all the layers to be common layers. In addition, part or the whole of the EL layer is partitioned by photolithography. Thus, leakage current through the common layer is suppressed; accordingly, a high-contrast display device can be achieved. In particular, when an element has a tandem structure in which a plurality of light-emitting layers are stacked with a highly conductive intermediate layer therebetween, leakage current through the intermediate layer can be effectively prevented, so that a display device with high luminance, high resolution, and high contrast can be achieved.

Furthermore, an insulating layer covering at least the side surface of the island-shaped light-emitting layer is preferably provided. The insulating layer may cover part of the top surface of an island-shaped EL layer. For the insulating layer, a material having a barrier property against water and oxygen is preferably used. For example, an inorganic insulating film that is less likely to diffuse water or oxygen can be used. This can inhibit degradation of the EL layer and can achieve a highly reliable display device.

Moreover, between two adjacent light-emitting elements, there is a region (a concave portion) where none of the EL layers of the light-emitting elements is provided. In the case where a common electrode or a common electrode and a common layer are formed to cover the concave portion, a phenomenon in which the common electrode is divided by a step at an end portion of the EL layer (such a phenomenon is also referred to as disconnection) might occur, which might cause insulation of the common electrode over the EL layer. In view of this, a local gap between the two adjacent light-emitting elements is preferably filled with a resin layer (LFP: also referred to as Local Filling Planarization) functioning as a planarization film. The resin layer has a function of a planarization film. This structure can inhibit disconnection of the common layer or the common electrode and can achieve a highly reliable display device.

More specific structure examples of the display device of one embodiment of the present invention will be described below with reference to drawings.

Structure Example 1

Figure 8A:
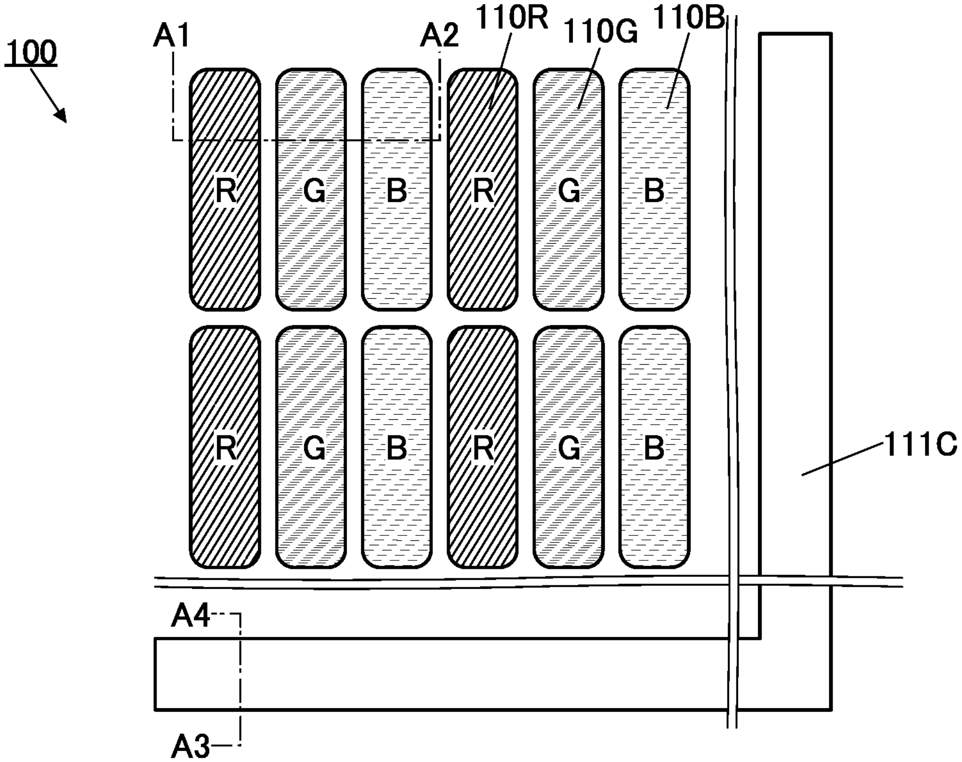
FIG. 8A to FIG. 8C are diagrams illustrating a structure example of a display device.

FIG. 8A illustrates a schematic top view of a display device 100 of one embodiment of the present invention. The display device 100 includes, over a substrate 101, a plurality of light-emitting elements 110R exhibiting red, a plurality of light-emitting elements 110G exhibiting green, and a plurality of light-emitting elements 110B exhibiting blue. In FIG. 8A, light-emitting regions of the light-emitting elements are denoted by R, G, and B to easily differentiate the light-emitting elements.

The light-emitting elements 110R, the light-emitting elements 110G, and the light-emitting elements 110B are each arranged in a matrix. FIG. 8A illustrates what is called a stripe arrangement, in which the light-emitting elements of the same color are arranged in one direction. Note that an arrangement method of the light-emitting elements is not limited thereto; an arrangement method typified by an S-stripe arrangement, a delta arrangement, a Bayer arrangement, or a zigzag arrangement may be employed, or a PenTile arrangement, a diamond arrangement, or the like can be also used.

As each of the light-emitting elements 110R, the light-emitting elements 110G, and the light-emitting elements 110B, an OLED (Organic Light Emitting Diode) or a QLED (Quantum-dot Light Emitting Diode) is preferably used, for example. As a light-emitting substance contained in the EL element, a substance that emits fluorescent light (a fluorescent material), a substance that emits phosphorescent light (a phosphorescent material), an inorganic compound (a quantum dot material), and a substance that exhibits thermally activated delayed fluorescence (a thermally activated delayed fluorescent (TADF) material) can be given, for example.

FIG. 8A also illustrates a connection electrode 111C that is electrically connected to a common electrode 113. The connection electrode 111C is supplied with a potential (e.g., an anode potential or a cathode potential) that is to be supplied to the common electrode 113. The connection electrode 111C is provided outside a display region where the light-emitting elements 110R are arranged.

The connection electrode 111C can be provided along the outer periphery of the display region. For example, the connection electrode 111C may be provided along one side of the outer periphery of the display region, or may be provided across two or more sides of the outer periphery of the display region. That is, in the case where the display region has a rectangular top surface shape, the top surface shape of the connection electrode 111C can be a band shape (a rectangle), an L shape, a U shape (a square bracket shape), or a quadrangular shape.

Figure 8B:
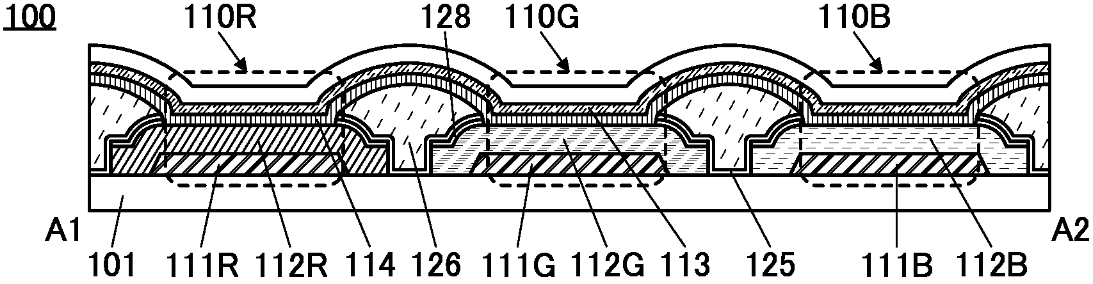
Figure 8C:
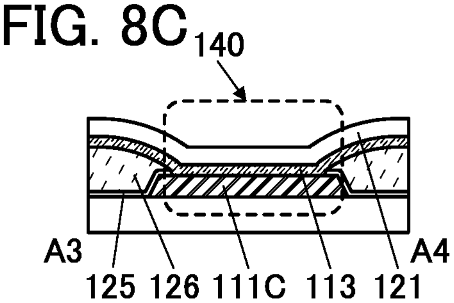

FIG. 8B and FIG. 8C are schematic cross-sectional views corresponding to the dashed-dotted line A1-A2 and the dashed-dotted line A3-A4 in FIG. 8A. FIG. 8B illustrates a schematic cross-sectional view of the light-emitting element 110R, the light-emitting element 110G, and the light-emitting element 110B, and FIG. 8C illustrates a schematic cross-sectional view of a connection portion 140 where the connection electrode 111C and the common electrode 113 are connected to each other.

The light-emitting element 110R includes a pixel electrode 111R, the first organic layer 112R, a common layer 114, and the common electrode 113. The light-emitting element 110G includes a pixel electrode 111G, the second organic layer 112G, the common layer 114, and the common electrode 113. The light-emitting element 110B includes a pixel electrode 111B, the third organic layer 112B, the common layer 114, and the common electrode 113. The common layer 114 and the common electrode 113 are provided to be shared by the light-emitting element 110R, the light-emitting element 110G, and the light-emitting element 110B.

The first organic layer 112R included in the light-emitting element 110R contains at least a light-emitting organic compound that emits light with intensity in a red wavelength range. The second organic layer 112G included in the light-emitting element 110G contains at least a light-emitting organic compound that emits light with intensity in a green wavelength range. The third organic layer 112B included in the light-emitting element 110B contains at least a light-emitting organic compound that emits light with intensity in a blue wavelength range. Each of the first organic layer 112R, the second organic layer 112G, and the third organic layer 112B can be also referred to as an EL layer and includes at least a layer containing a light-emitting organic compound (a light-emitting layer).

Hereinafter, the term "light-emitting element 110" is sometimes used to describe matters common to the light-emitting element 110R, the light-emitting element 110G, and the light-emitting element 110B. Similarly, in the description of matters common to components that are distinguished from each other using alphabets, such as the first organic layer 112R, the second organic layer 112G, and the third organic layer 112B, the term "organic layer 112" using a reference numeral without an alphabet is used for description in some cases.

The organic layer 112 and the common layer 114 can each independently include one or more of an electron-injection layer, an electron-transport layer, a hole-injection layer, and a hole-transport layer. For example, it is possible to employ a structure in which the organic layer 112 includes a stacked-layer structure of a hole-injection layer, a hole-transport layer, a light-emitting layer, and an electron-transport layer from the pixel electrode 111 side and the common layer 114 includes an electron-injection layer.

The pixel electrode 111R, the pixel electrode 111G, and the pixel electrode 111B are provided for the respective light-emitting elements. In addition, the common electrode 113 and the common layer 114 are each provided as a continuous layer shared by the light-emitting elements. A conductive film having a property of transmitting visible light is used for either the pixel electrodes or the common electrode 113, and a conductive film having a reflective property is used for the other. When the pixel electrodes have light-transmitting properties and the common electrode 113 has a reflective property, a bottom-emission display device can be obtained. In contrast, when the pixel electrodes have reflective properties and the common electrode 113 has a light-transmitting property, a top-emission display device can be obtained. Note that when both the pixel electrodes and the common electrode 113 have light-transmitting properties, a dual-emission display device can be also obtained.

A protective layer 121 is provided over the common electrode 113 to cover the light-emitting element 110R, the light-emitting element 110G, and the light-emitting element 110B. The protective layer 121 has a function of preventing diffusion of impurities typified by water into each light-emitting element from the above.

An end portion of the pixel electrode 111 preferably has a tapered shape. In the case where the end portion of the pixel electrode has a tapered shape, a portion of the organic layer 112 that is provided along the side surface of the pixel electrode also has a tapered shape. When the side surface of the pixel electrode has a tapered shape, coverage with the EL layer provided along the side surface of the pixel electrode can be improved. Furthermore, when the side surface of the pixel electrode has a tapered shape, a foreign matter (for example, also referred to as dust or particles) in a manufacturing step is easily removed by cleaning treatment, which is preferable.

Note that in this specification, a tapered shape indicates a shape in which at least part of the side surface of a structure is inclined to a substrate surface. For example, a tapered shape preferably includes a region where an angle formed between the inclined side surface and the substrate surface (such an angle is also referred to as a taper angle) is less than 90°.

The organic layer 112 is processed into an island shape by a photolithography method. Thus, an angle formed between the top surface and the side surface of an end portion of the organic layer 112 is approximately 90°. In contrast, an organic film formed using an FMM (Fine Metal Mask) has a thickness that tends to gradually decrease with decreasing the distance from an end portion, and has a top surface forming a slope in an area extending in the range of greater than or equal to 1 μm and less than or equal to 10 μm from the end portion, for example. Thus, such an organic film has a shape whose top surface and side surface are difficult to distinguish from each other.

An insulating layer 125, a resin layer 126, and a layer 128 are included between two adjacent light-emitting elements.

Between two adjacent light-emitting elements, the side surfaces of the organic layers 112 are provided to face each other with the resin layer 126 therebetween. The resin layer 126 is positioned between the two adjacent light-emitting elements and is provided to fill end portions of the organic layers 112 and a region between the two organic layers 112. The resin layer 126 has a top surface with a smooth convex shape. The common layer 114 and the common electrode 113 are provided to cover the top surface of the resin layer 126.

The resin layer 126 functions as a planarization film that fills a step positioned between two adjacent light-emitting elements. Providing the resin layer 126 can prevent a phenomenon in which the common electrode 113 is divided by a step at an end portion of the organic layer 112 (such a phenomenon is also referred to as disconnection) from occurring and the common electrode over the organic layer 112 from being insulated. The resin layer 126 can be also referred to as LFP (Local Filling Planarization).

An insulating layer containing an organic material can be suitably used as the resin layer 126. For the resin layer 126, an acrylic resin, a polyimide resin, an epoxy resin, an imide resin, a polyamide resin, a polyimide-amide resin, a silicone resin, a siloxane resin, a benzocyclobutene-based resin, a phenol resin, or a precursor of these resins can be used, for example. For the resin layer 126, an organic material such as polyvinyl alcohol (PVA), polyvinylbutyral, polyvinylpyrrolidone, polyethylene glycol, polyglycerin, pullulan, water-soluble cellulose, or an alcohol-soluble polyamide resin may be used.

Alternatively, a photosensitive resin can be used for the resin layer 126. A photoresist may be used for the photosensitive resin. As the photosensitive resin, a positive photosensitive material or a negative photosensitive material can be used.

The resin layer 126 may contain a material absorbing visible light. For example, the resin layer 126 itself may be made of a material absorbing visible light, or the resin layer 126 may contain a pigment absorbing visible light. For example, for the resin layer 126, it is possible to use a resin that can be used as a color filter transmitting red, blue, or green light and absorbing other light or a resin that contains carbon black as a pigment and functions as a black matrix.

The insulating layer 125 is provided in contact with the side surfaces of the organic layers 112. In addition, the insulating layer 125 is provided to cover an upper end portion of the organic layer 112. Furthermore, part of the insulating layer 125 is provided in contact with the top surface of the substrate 101.

The insulating layer 125 is positioned between the resin layer 126 and the organic layer 112 and functions as a protective film for preventing contact between the resin layer 126 and the organic layer 112. When the organic layer 112 and the resin layer 126 are in contact with each other, the organic layer 112 might be dissolved by an organic solvent used at the time of forming the resin layer 126. Therefore, by employing the structure in which the insulating layer 125 is provided between the organic layer 112 and the resin layer 126 as described in this embodiment, the side surfaces of the organic layer can be protected.

An insulating layer containing an inorganic material can be used for the insulating layer 125. For the insulating layer 125, an inorganic insulating film typified by an oxide insulating film, a nitride insulating film, an oxynitride insulating film, or a nitride oxide insulating film can be used, for example. The insulating layer 125 may have either a single-layer structure or a stacked-layer structure. Examples of the oxide insulating film include a silicon oxide film, an aluminum oxide film, a magnesium oxide film, an indium gallium zinc oxide film, a gallium oxide film, a germanium oxide film, an yttrium oxide film, a zirconium oxide film, a lanthanum oxide film, a neodymium oxide film, a hafnium oxide film, and a tantalum oxide film. Examples of the nitride insulating film include a silicon nitride film and an aluminum nitride film. Examples of the oxynitride insulating film include a silicon oxynitride film and an aluminum oxynitride film. Examples of the nitride oxide insulating film include a silicon nitride oxide film and an aluminum nitride oxide film. In particular, when a metal oxide film typified by an aluminum oxide film or a hafnium oxide film or an inorganic insulating film typified by a silicon oxide film that is formed by an ALD method is employed for the insulating layer 125, it is possible to form the insulating layer 125 that has a small number of pinholes and has an excellent function of protecting the EL layer.

Note that in this specification, oxynitride refers to a material that contains more oxygen than nitrogen in its composition, and nitride oxide refers to a material that contains more nitrogen than oxygen in its composition. For example, in the case where silicon oxynitride is described, it refers to a material that contains more oxygen than nitrogen in its composition. In the case where silicon nitride oxide is described, it refers to a material that contains more nitrogen than oxygen in its composition.

For the formation of the insulating layer 125, a sputtering method, a CVD method, a PLD method, or an ALD method can be used. The insulating layer 125 is preferably formed by an ALD method achieving good coverage.

In addition, a structure may be employed in which a reflective film (e.g., a metal film containing one or more selected from silver, palladium, copper, titanium, and aluminum) is provided between the insulating layer 125 and the resin layer 126 so that light emitted from the light-emitting layer is reflected by the reflective film. This can improve light extraction efficiency.

The layer 128 is a remaining part of a protective layer (also referred to as a mask layer or a sacrificial layer) for protecting the organic layer 112 during etching of the organic layer 112. For the layer 128, a material that can be used for the insulating layer 125 can be used. It is particularly preferable to use the same material for the layer 128 and the insulating layer 125 because an apparatus for processing can be used in common.

In particular, since a metal oxide film typified by an aluminum oxide film or a hafnium oxide film or an inorganic insulating film typified by a silicon oxide film that is formed by an ALD method has a small number of pinholes, such a film has an excellent function of protecting the EL layer and can be suitably used for the insulating layer 125 and the layer 128.

The protective layer 121 is provided to cover the common electrode 113.

The protective layer 121 can have, for example, a single-layer structure or a stacked-layer structure including at least an inorganic insulating film. Examples of the inorganic insulating film include an oxide film, an oxynitride film, a nitride oxide film, and a nitride film, typified by a silicon oxide film, a silicon oxynitride film, a silicon nitride oxide film, a silicon nitride film, an aluminum oxide film, an aluminum oxynitride film, and a hafnium oxide film. Alternatively, a semiconductor material or a conductive material typified by indium gallium oxide, indium zinc oxide, indium tin oxide, or indium gallium zinc oxide may be used for the protective layer 121.

For the protective layer 121, a stacked film of an inorganic insulating film and an organic insulating film can be used. For example, a structure in which an organic insulating film is sandwiched between a pair of inorganic insulating films is preferable. Furthermore, the organic insulating film preferably functions as a planarization film. This enables the top surface of the organic insulating film to be flat, which results in improved coverage with the inorganic insulating film thereover and a higher barrier property. Moreover, the top surface of the protective layer 121 is flat; therefore, when a structural object (e.g., a color filter, an electrode of a touch sensor, or a lens array) is provided above the protective layer 121, the structural object can be less affected by an uneven shape caused by a lower structure.

FIG. 8C illustrates the connection portion 140 where the connection electrode 111C and the common electrode 113 are electrically connected to each other. In the connection portion 140, an opening portion is provided in the insulating layer 125 and the resin layer 126 over the connection electrode 111C. The connection electrode 111C and the common electrode 113 are electrically connected to each other in the opening portion.

Note that although FIG. 8C illustrates the connection portion 140 where the connection electrode 111C and the common electrode 113 are electrically connected to each other, the common electrode 113 may be provided over the connection electrode 111C with the common layer 114 therebetween. Particularly in the case where a carrier-injection layer is used as the common layer 114, a material used for the common layer 114 has sufficiently low electrical resistivity and the common layer 114 can be formed to be thin. Thus, problems do not arise in many cases even when the common layer 114 is positioned in the connection portion 140. Accordingly, the common electrode 113 and the common layer 114 can be formed using the same shielding mask, so that manufacturing cost can be reduced.

The above is the description of the structure example of the display device.

[Pixel Layout]

Pixel layout different from that in FIG. 8A will be mainly described below. There is no particular limitation on the arrangement of light-emitting elements (subpixels), and a variety of methods can be employed.

In addition, examples of a top surface shape of the subpixel include polygons typified by a triangle, a tetragon (including a rectangle and a square), and a pentagon; polygons with rounded corners; an ellipse; and a circle. Here, the top surface shape of the subpixel corresponds to a top surface shape of a light-emitting region of the light-emitting element.

Figure 9A:
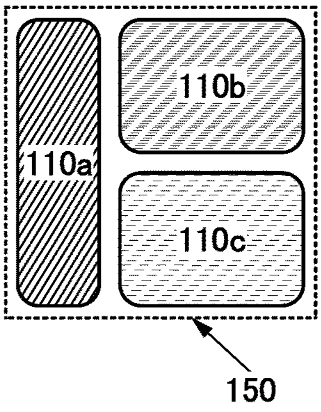
FIG. 9A to FIG. 9F are diagrams illustrating pixel structure examples.

A pixel 150 illustrated in FIG. 9A employs an S-stripe arrangement. The pixel 150 illustrated in FIG. 9A is composed of three subpixels: light-emitting elements 110*a*, 110*b*, and 110*c*. For example, the light-emitting element 110*a* may be a blue light-emitting element, the light-emitting element 110*b* may be a red light-emitting element, and the light-emitting element 110*c* may be a green light-emitting element.

Figure 9B:
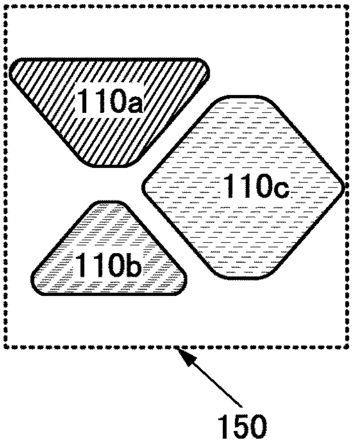

The pixel 150 illustrated in FIG. 9B includes the light-emitting element 110*a* whose top surface has a rough trapezoidal shape with rounded corners, the light-emitting element 110*b* whose top surface has a rough triangle shape with rounded corners, and the light-emitting element 110*c* whose top surface has a rough tetragonal or rough hexagonal shape with rounded corners. In addition, the light-emitting element 110*a* has a larger light-emitting area than the light-emitting element 110*b*. In this manner, the shapes and sizes of the light-emitting elements can be determined independently. For example, the size of a light-emitting element with higher reliability can be made smaller. For example, the light-emitting element 110*a* may be a green light-emitting element, the light-emitting element 110*b* may be a red light-emitting element, and the light-emitting element 110*c* may be a blue light-emitting element.

Figure 9C:
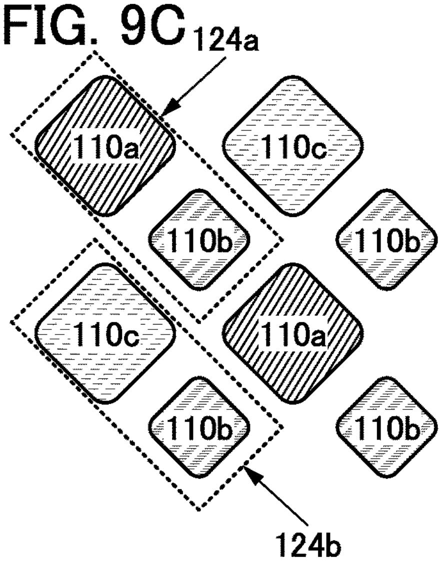

Pixels 124*a* and 124*b* illustrated in FIG. 9C employ a PenTile arrangement. FIG. 9C illustrates an example in which the pixels 124*a* each including the light-emitting element 110*a* and the light-emitting element 110*b* and the pixels 124*b* each including the light-emitting element 110*b* and the light-emitting element 110*c* are alternately arranged. For example, the light-emitting element 110*a* may be a red light-emitting element, the light-emitting element 110*b* may be a green light-emitting element, and the light-emitting element 110*c* may be a blue light-emitting element.

Figure 9D:
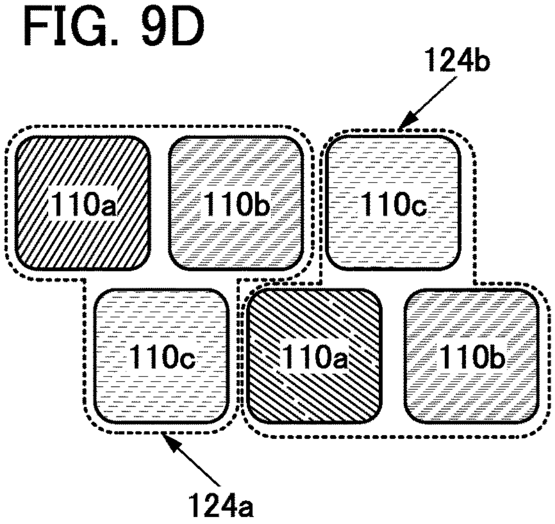
Figure 9E:
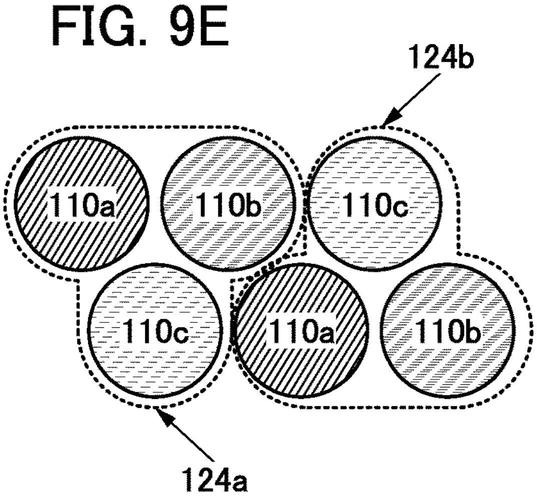

The pixels 124*a* and 124*b* illustrated in FIG. 9D and FIG. 9E employ a delta arrangement. The pixel 124*a* includes two light-emitting elements (the light-emitting elements 110*a* and 110*b*) in an upper row (a first row) and one light-emitting element (the light-emitting element 110*c*) in a lower row (a second row). The pixel 124*b* includes one light-emitting element (the light-emitting element 110*c*) in the upper row (the first row) and two light-emitting elements (the light-emitting elements 110*a* and 110*b*) in the lower row (the second row). For example, the light-emitting element 110*a* may be a red light-emitting element, the light-emitting element 110*b* may be a green light-emitting element, and the light-emitting element 110*c* may be a blue light-emitting element.

FIG. 9D illustrates an example in which the top surface of each light-emitting element has a rough tetragonal shape with rounded corners, and FIG. 9E illustrates an example in which the top surface of each light-emitting element is circular.

Figure 9F:
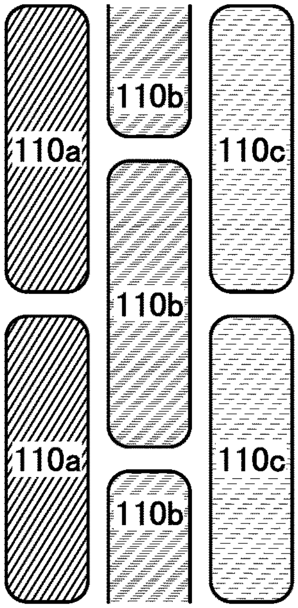

FIG. 9F illustrates an example in which light-emitting elements of different colors are arranged in a zigzag manner. Specifically, the positions of top sides of two light-emitting elements arranged in a column direction (e.g., the light-emitting element 110*a* and the light-emitting element 110*b* or the light-emitting element 110*b* and the light-emitting element 110*c*) are not aligned in a top view. For example, the light-emitting element 110*a* may be a red light-emitting element, the light-emitting element 110*b* may be a green light-emitting element, and the light-emitting element 110*c* may be a blue light-emitting element.

In a photolithography method, as a pattern to be processed becomes finer, the influence of light diffraction becomes more difficult to ignore; accordingly, fidelity in transferring a photomask pattern by light exposure is degraded, and it becomes difficult to process a resist mask into a desired shape. Thus, a pattern with rounded corners is likely to be formed even with a rectangular photomask pattern. Consequently, the top surface of a light-emitting element has a polygonal shape with rounded corners, an elliptical shape, or a circular shape in some cases.

Furthermore, in a method for manufacturing a display panel of one embodiment of the present invention, the EL layer is processed into an island shape with the use of a resist mask. A resist film formed over the EL layer needs to be cured at a temperature lower than the upper temperature limit of the EL layer. Thus, the resist film is insufficiently cured in some cases depending on the upper temperature limit of the material of the EL layer and the curing temperature of a resist material. An insufficiently cured resist film might have a shape different from a desired shape at the time of processing. As a result, the top surface of the EL layer has a polygonal shape with rounded corners, an elliptical shape, or a circular shape in some cases. For example, when a resist mask with a square top surface is intended to be formed, a resist mask with a circular top surface might be formed, and the top surface of the EL layer might be circular.

Note that to obtain a desired top surface shape of the EL layer, a technique of correcting a mask pattern in advance so that a transferred pattern agrees with a design pattern (an OPC (Optical Proximity Correction) technique) may be used. Specifically, with the OPC technique, a pattern for correction is added to a corner portion of a figure on a mask pattern.

The above is the description of the pixel layout.

At least part of this embodiment can be implemented in appropriate combination with the other embodiments described in this specification.

Embodiment 5

In this embodiment, structure examples of a display device of one embodiment of the present invention will be described.

The display device of this embodiment can be used for, for example, display portions of a digital camera, a digital video camera, a digital photo frame, a cellular phone, a portable game machine, a smartphone, a wristwatch-type terminal, a tablet terminal, a portable information terminal, and an audio reproducing device, in addition to electronic devices with comparatively large screens, such as a television device, a desktop or laptop personal computer, a monitor for a computer, digital signage, and a large-sized game machine typified by a pachinko machine.

[Display Device 400]

Figure 10:
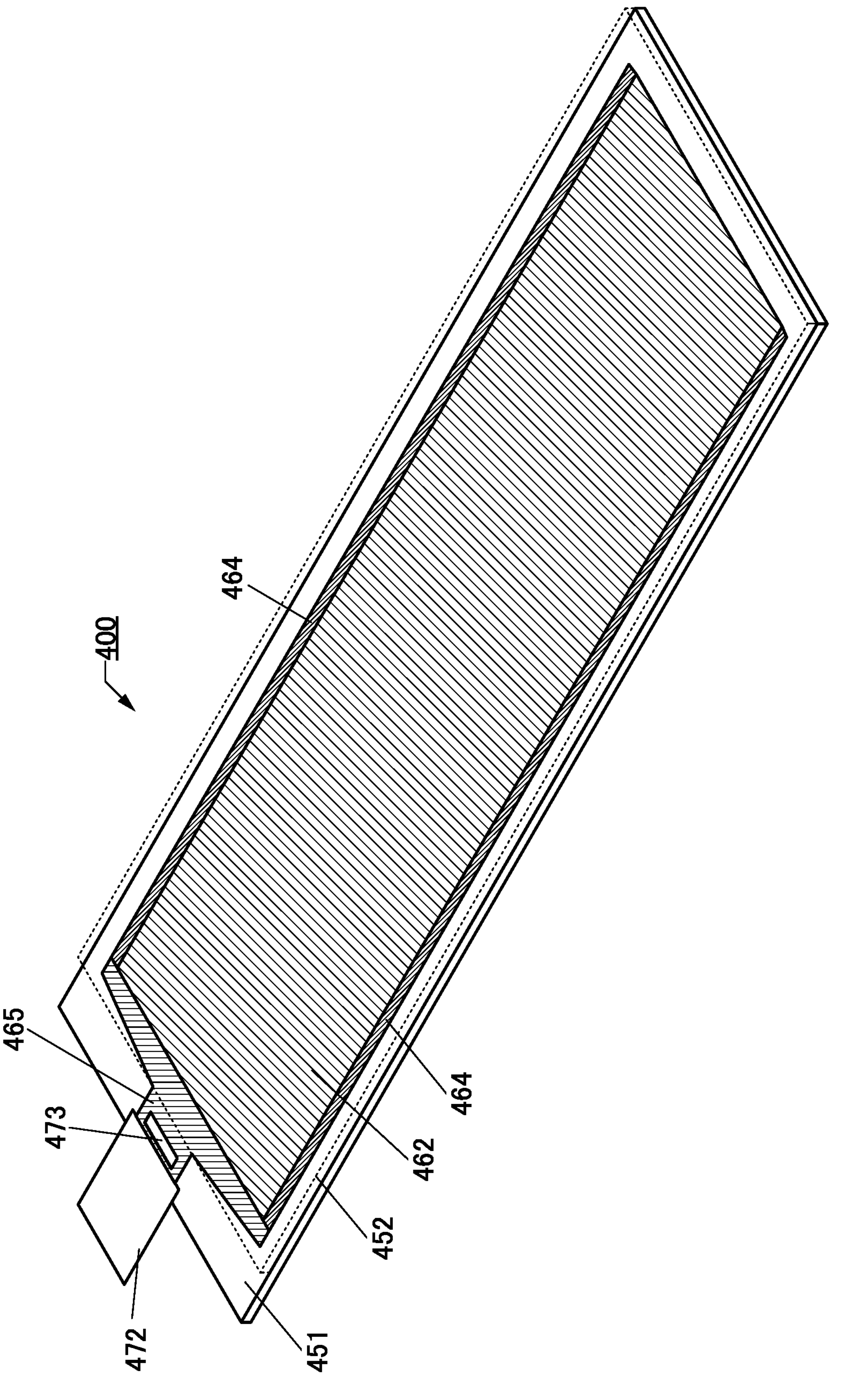
FIG. 10 is a diagram illustrating a structure example of a display device.
Figure 11A:
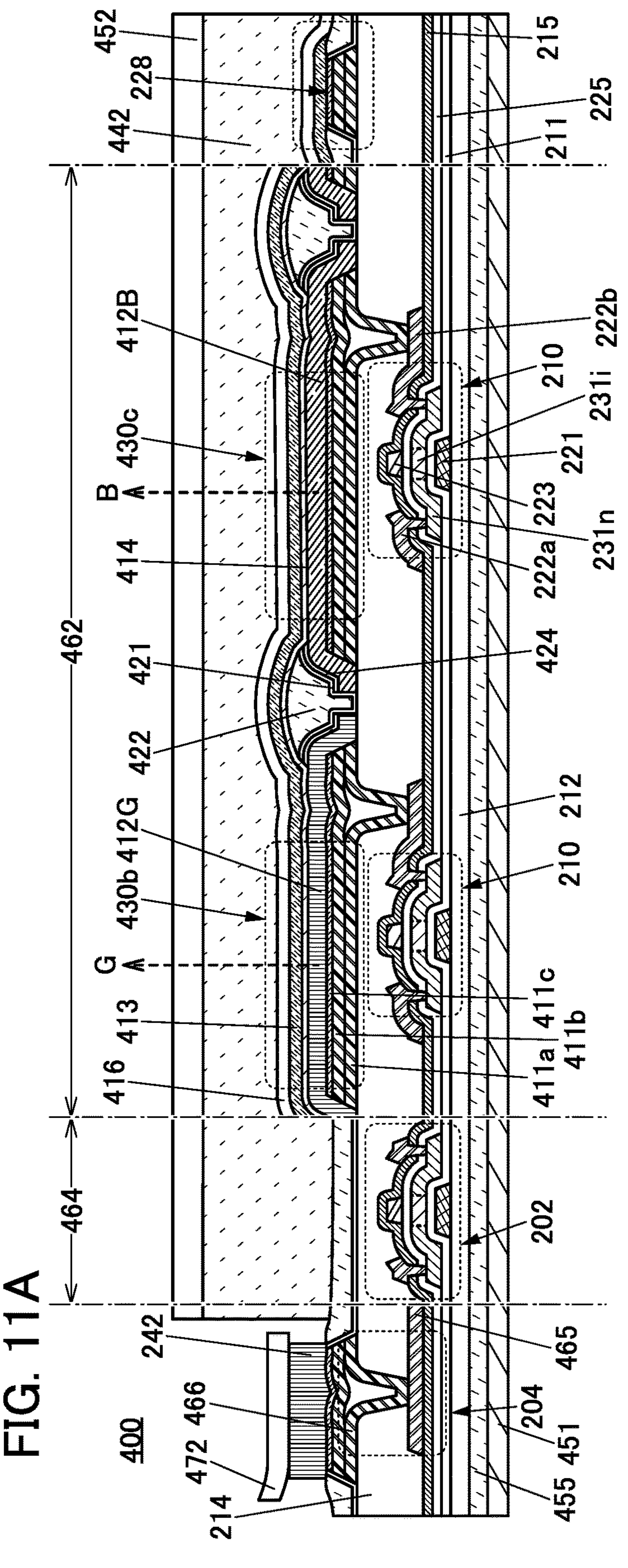
FIG. 11A and FIG. 11B are diagrams illustrating structure examples of the display device.

FIG. 10 is a perspective view of a display device 400 having a long and narrow rectangular shape (also referred to as a band shape), and FIG. 11A is a cross-sectional view of the display device 400.

The display device 400 has a structure in which a substrate 452 and a substrate 451 are attached to each other. In FIG. 10, the substrate 452 is denoted by a dashed line. In the case where the substrate 452 and the substrate 451 are flexible films, the display device 61G including the display region with a curved band shape illustrated in FIG. 1 can be obtained.

The display device 400 includes a display portion 462, a circuit 464, and a wiring 465. FIG. 10 illustrates an example in which an IC 473 and an FPC 472 are implemented on the display device 400. Thus, the structure illustrated in FIG. 10 can be regarded as a display module including the display device 400, the IC (integrated circuit), and the FPC.

As the circuit 464, a scan line driver circuit can be used, for example.

The wiring 465 has a function of supplying a signal and power to the display portion 462 and the circuit 464. The signal and power are input to the wiring 465 from the outside through the FPC 472 or input to the wiring 465 from the IC 473.

FIG. 10 illustrates an example in which the IC 473 is provided over the substrate 451 by a COG (Chip On Glass) method or a COF (Chip on Film) method. An IC including a scan line driver circuit or a signal line driver circuit can be employed as the IC 473, for example. Note that the display device 400 and the display module are not necessarily provided with an IC. In addition, the IC may be implemented on the FPC by a COF method.

FIG. 11A illustrates an example of a cross section of the display device 400 when part of a region including the FPC 472, part of the circuit 464, part of the display portion 462, and part of a region including a connection portion are cut. FIG. 11A particularly illustrates an example of a cross section of the display portion 462 when a region including a light-emitting element 430*b* that emits green light and a light-emitting element 430*c* that emits blue light is cut.

The display device 400 illustrated in FIG. 11A includes a transistor 202, transistors 210, the light-emitting element 430*b*, and the light-emitting element 430*c* between a substrate 451 and a substrate 452.

Here, in the case where a pixel of the display device includes three kinds of subpixels including light-emitting elements that emit light of different colors, subpixels of three colors of red (R), green (G), and blue (B) and subpixels of three colors of yellow (Y), cyan (C), and magenta (M) can be given as the three subpixels. In the case where the pixel includes four subpixels, subpixels of four colors of R, G, B, and white (W) and subpixels of four colors of R, G, B, and Y can be given as the four subpixels.

The substrate 452 and a protective layer 416 are bonded to each other with an adhesive layer 442. The adhesive layer 442 is provided to overlap with the light-emitting element 430*b* and the light-emitting element 430*c*, and the display device 400 employs a solid sealing structure.

The light-emitting element 430*b* and the light-emitting element 430*c* each include a conductive layer 411*a*, a conductive layer 411*b*, and a conductive layer 411*c* as a pixel electrode. The conductive layer 411*b* has a property of reflecting visible light and functions as a reflective electrode. The conductive layer 411*c* has a property of transmitting visible light and functions as an optical adjustment layer.

The conductive layer 411*a* is connected to a conductive layer 222*b* included in the transistor 210 through an opening provided in an insulating layer 214. The transistor 210 has a function of controlling driving of the light-emitting element.

An EL layer 412G or an EL layer 412B is provided to cover the pixel electrode. An insulating layer 421 is provided in contact with the side surface of the EL layer 412G and the side surface of the EL layer 412B, and a resin layer 422 is provided to fill a concave portion of the insulating layer 421. A layer 424 is provided between the EL layer 412G and the insulating layer 421 and between the EL layer 412B and the insulating layer 421. A common layer 414, a common electrode 413, and the protective layer 416 are provided to cover the EL layer 412G and the EL layer 412B.

Light emitted from the light-emitting element is emitted toward the substrate 452 side. For the substrate 452, a material having a high property of transmitting visible light is preferably used.

The transistor 202 and the transistor 210 are each formed over the substrate 451. These transistors can be manufactured using the same material in the same step.

The substrate 451 and an insulating layer 212 are attached to each other with an adhesive layer 455.

As a method for manufacturing the display device 400, first, a manufacture substrate provided with the insulating layer 212, the transistors, and the light-emitting elements is attached to the substrate 452 with the adhesive layer 442. Then, the substrate 451 is attached to a surface exposed by separation of the manufacture substrate, so that the components formed over the manufacture substrate are transferred to the substrate 451. As a separation method and a transfer method, known techniques are employed. The substrate 451 and the substrate 452 each preferably have flexibility. This can increase the flexibility of the display device 400.

An inorganic insulating film that can be used for each of an insulating layer 211 and an insulating layer 215 can be used for the insulating layer 212.

A connection portion 204 is provided in a region of the substrate 451 where the substrate 451 and the substrate 452 do not overlap with each other. In the connection portion 204, the wiring 465 is electrically connected to the FPC 472 through a conductive layer 466 and a connection layer 242. The conductive layer 466 can be obtained by processing the same conductive film as the pixel electrode. Thus, the connection portion 204 and the FPC 472 can be electrically connected to each other through the connection layer 242.

Each of the transistor 202 and the transistor 210 includes a conductive layer 221 functioning as a gate, the insulating layer 211 functioning as a gate insulating layer, a semiconductor layer 231 including a channel formation region 231*i* and a pair of low-resistance regions 231*n*, a conductive layer 222*a* connected to one of the pair of low-resistance regions 231*n*, the conductive layer 222*b* connected to the other of the pair of low-resistance regions 231*n*, an insulating layer 225 functioning as a gate insulating layer, a conductive layer 223 functioning as a gate, and the insulating layer 215 covering the conductive layer 223. The insulating layer 211 is positioned between the conductive layer 221 and the channel formation region 231*i*. The insulating layer 225 is positioned between the conductive layer 223 and the channel formation region 231*i*.

The conductive layer 222*a* and the conductive layer 222*b* are connected to the low-resistance regions 231*n* through openings provided in the insulating layer 215. One of the conductive layer 222*a* and the conductive layer 222*b* functions as a source, and the other of the conductive layer 222*a* and the conductive layer 222*b* functions as a drain.

FIG. 11A illustrates an example in which the insulating layer 225 covers the top surface and the side surfaces of the semiconductor layer. The conductive layer 222*a* and the conductive layer 222*b* are connected to the low-resistance regions 231*n* through openings provided in the insulating layer 225 and the insulating layer 215.

Figure 11B:
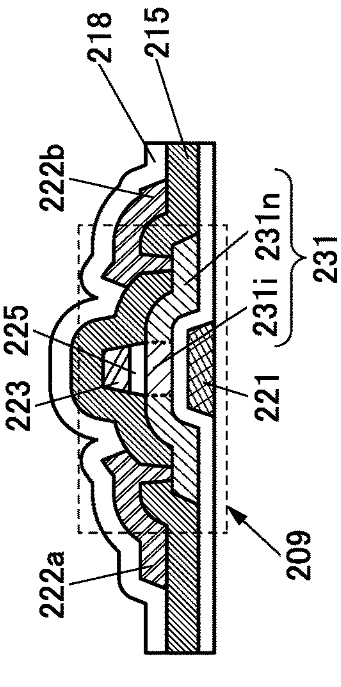

In contrast, in a transistor 209 illustrated in FIG. 11B, the insulating layer 225 overlaps with the channel formation region 231*i* of the semiconductor layer 231 and does not overlap with the low-resistance regions 231*n*. The structure illustrated in FIG. 11B can be manufactured by processing the insulating layer 225 with the conductive layer 223 as a mask, for example. In FIG. 11B, the insulating layer 215 is provided to cover the insulating layer 225 and the conductive layer 223, and the conductive layer 222*a* and the conductive layer 222*b* are connected to the low-resistance regions 231*n* through openings in the insulating layer 215. Furthermore, an insulating layer 218 covering the transistor may be provided.

There is no particular limitation on the structure of the transistors included in the display device of this embodiment. For example, a planar transistor, a staggered transistor, or an inverted staggered transistor can be used. In addition, either of a top-gate transistor structure and a bottom-gate transistor structure may be employed. Alternatively, gates may be provided above and below a semiconductor layer where a channel is formed.

The structure in which the semiconductor layer where a channel is formed is sandwiched between two gates is employed for the transistor 202 and the transistor 210. The two gates may be connected to each other and supplied with the same signal to drive the transistor. Alternatively, the threshold voltage of the transistor may be controlled by applying a potential for controlling the threshold voltage to one of the two gates and a potential for driving to the other of the two gates.

There is no particular limitation on the crystallinity of a semiconductor material used for the semiconductor layer of the transistor, and any of an amorphous semiconductor, a single crystal semiconductor, and a semiconductor having crystallinity other than single crystal (a microcrystalline semiconductor, a polycrystalline semiconductor, or a semiconductor partly including crystal regions) may be used. It is preferable to use a single crystal semiconductor or a semiconductor having crystallinity because degradation of transistor characteristics can be inhibited.

The semiconductor layer of the transistor preferably contains a metal oxide exhibiting semiconductor characteristics (also referred to as an oxide semiconductor). That is, a transistor using a metal oxide in its channel formation region (hereinafter an OS transistor) is preferably used for the display device of this embodiment.

The band gap of a metal oxide used for the semiconductor layer of the transistor is preferably greater than or equal to 2 eV, further preferably greater than or equal to 2.5 eV. With the use of a metal oxide having a wide bandgap, the off-state current of the OS transistor can be reduced.

A metal oxide preferably contains at least indium or zinc, and further preferably contains indium and zinc. The metal oxide preferably contains indium, M (M is one or more kinds selected from gallium, aluminum, yttrium, tin, silicon, boron, copper, vanadium, beryllium, titanium, iron, nickel, germanium, zirconium, molybdenum, lanthanum, cerium, neodymium, hafnium, tantalum, tungsten, magnesium, and cobalt), and zinc, for example.

Alternatively, the semiconductor layer of the transistor may contain silicon. Examples of silicon include amorphous silicon and crystalline silicon (low-temperature polysilicon or single crystal silicon).

The transistor included in the circuit 464 and the transistor included in the display portion 462 may have either the same structure or different structures. A plurality of transistors included in the circuit 464 may have either the same structure or two or more kinds of structures. Similarly, a plurality of transistors included in the display portion 462 may have either the same structure or two or more kinds of structures.

A material through which impurities typified by water and hydrogen do not easily diffuse is preferably used for at least one of the insulating layers covering the transistors. Thus, such an insulating layer can function as a barrier layer. Such a structure can effectively inhibit diffusion of impurities into the transistors from the outside and can increase the reliability of the display device.

An inorganic insulating film is preferably used for each of the insulating layer 211, the insulating layer 212, the insulating layer 215, the insulating layer 218, and the insulating layer 225. As the inorganic insulating film, a silicon nitride film, a silicon oxynitride film, a silicon oxide film, a silicon nitride oxide film, an aluminum oxide film, or an aluminum nitride film can be used, for example. Alternatively, a hafnium oxide film, an yttrium oxide film, a zirconium oxide film, a gallium oxide film, a tantalum oxide film, a magnesium oxide film, a lanthanum oxide film, a cerium oxide film, or a neodymium oxide film may be used. A stack including two or more of the above inorganic insulating films may also be used.

An organic insulating film is suitable for the insulating layer 214 functioning as a planarization layer. Examples of materials that can be used for the organic insulating film include an acrylic resin, a polyimide resin, an epoxy resin, a polyamide resin, a polyimide-amide resin, a siloxane resin, a benzocyclobutene-based resin, a phenol resin, and precursors of these resins. A variety of optical members can be arranged on the inner or outer surface of the substrate 452. Examples of the optical members include a light-blocking layer, a polarizing plate, a retardation plate, a light diffusion layer (a diffusion film), an anti-reflection layer, a microlens array, and a light-condensing film. Furthermore, an antistatic film inhibiting attachment of dust, a water repellent film suppressing attachment of stain, a hard coat film inhibiting generation of a scratch caused by the use, or a shock absorbing layer may be provided on the outside of the substrate 452.

Providing the protective layer 416 that covers the light-emitting element can inhibit entry of impurities typified by water into the light-emitting element, so that the reliability of the light-emitting element can be increased.

FIG. 11A illustrates a connection portion 228. In the connection portion 228, the common electrode 413 is electrically connected to a wiring. FIG. 11A illustrates an example in which the wiring has the same stacked-layer structure as the pixel electrode.

For each of the substrate 451 and the substrate 452, glass, quartz, ceramics, sapphire, a resin, a metal, an alloy, or a semiconductor can be used. For the substrate on the side from which light from the light-emitting element is extracted, a material that transmits the light is used. When a flexible material is used for the substrate 451 and the substrate 452, the flexibility of the display device can be increased. Furthermore, a polarizing plate may be used as the substrate 451 or the substrate 452.

For each of the substrate 451 and the substrate 452, a polyester resin typified by polyethylene terephthalate (PET) or polyethylene naphthalate (PEN), a polyacrylonitrile resin, an acrylic resin, a polyimide resin, a polymethyl methacrylate resin, a polycarbonate (PC) resin, a polyether sulfone (PES) resin, a polyamide resin (nylon or aramid), a polysiloxane resin, a cycloolefin resin, a polystyrene resin, a polyamide-imide resin, a polyurethane resin, a polyvinyl chloride resin, a polyvinylidene chloride resin, a polypropylene resin, a polytetrafluoroethylene (PTFE) resin, an ABS resin, or cellulose nanofiber can be used. Glass that is thin enough to have flexibility may be used for one or both of the substrate 451 and the substrate 452.

For the adhesive layer (442), a variety of curable adhesives typified by an ultraviolet curable adhesive, a reactive curable adhesive, a thermosetting adhesive, and an anaerobic adhesive can be used. Examples of these adhesives include an epoxy resin, an acrylic resin, a silicone resin, a phenol resin, a polyimide resin, an imide resin, a PVC (polyvinyl chloride) resin, a PVB (polyvinyl butyral) resin, and an EVA (ethylene vinyl acetate) resin. In particular, a material with low moisture permeability that is an epoxy resin is preferred. Alternatively, a two-liquid-mixture-type resin may be used. Alternatively, an adhesive sheet may be used.

As the connection layer 242, an anisotropic conductive film (ACF) or an anisotropic conductive paste (ACP) can be used.

As materials that can be used for conductive layers such as a variety of wirings and electrodes that constitute the display device, in addition to a gate, a source, and a drain of a transistor, a metal typified by aluminum, titanium, chromium, nickel, copper, yttrium, zirconium, molybdenum, silver, tantalum, or tungsten, and an alloy containing the metal as its main component can be given. A film containing these materials can be used in a single layer or as a stacked-layer structure.

In addition, as a light-transmitting conductive material, a conductive oxide typified by indium oxide, indium tin oxide, indium zinc oxide, zinc oxide, or zinc oxide containing gallium, or graphene can be used. Alternatively, a metal material typified by gold, silver, platinum, magnesium, nickel, tungsten, chromium, molybdenum, iron, cobalt, copper, palladium, or titanium, or an alloy material containing the metal material can be used. Alternatively, a nitride of the metal material (e.g., titanium nitride) may be used. Note that in the case of using the metal material or the alloy material (or the nitride thereof), the material is preferably made thin enough to have a light-transmitting property. Furthermore, a stacked-layer film of the above materials can be used for a conductive layer. For example, a stacked-layer film of indium tin oxide and an alloy of silver and magnesium is preferably used because conductivity can be increased. They can be also used for conductive layers typified by a variety of wirings and electrodes that constitute the display device, and conductive layers (conductive layers functioning as a pixel electrode or a common electrode) included in the light-emitting element.

As an insulating material that can be used for each insulating layer, for example, a resin typified by an acrylic resin or an epoxy resin, and an inorganic insulating material typified by silicon oxide, silicon oxynitride, silicon nitride oxide, silicon nitride, or aluminum oxide can be given.

At least part of this embodiment can be implemented in appropriate combination with the other embodiments described in this specification. For example, in order to achieve a wide display area composed of a curved surface or a flat surface, a plurality of display devices 400 are preferably used in combination, and a boundary between adjacent display regions is preferably made unnoticeable.

Embodiment 6

In this embodiment, a light-emitting element (also referred to as a light-emitting device) that can be used in the display device of one embodiment of the present invention will be described.

[Light-Emitting Device]

Light-emitting devices can be classified roughly into a single structure and a tandem structure. A device having a single structure includes one light-emitting unit between a pair of electrodes. The light-emitting unit includes one or more light-emitting layers. When white light emission is obtained using two light-emitting layers each having a single structure, two light-emitting layers are selected such that emission colors of the two light-emitting layers are complementary colors. For example, in the case of two colors, when the emission color of a first light-emitting layer and the emission color of a second light-emitting layer have a relationship of complementary colors, it is possible to obtain a structure where the light-emitting device emits white light as a whole. Furthermore, in the case where white light emission is obtained using three or more light-emitting layers, the light-emitting device is configured to be able to emit white light as a whole by combining the emission colors of the three or more light-emitting layers. The same applies to a light-emitting device including three or more light-emitting layers.

A device having a tandem structure includes a plurality of light-emitting units between a pair of electrodes, and each light-emitting unit includes one or more light-emitting layers. When light-emitting layers that emit light of the same color are used in each light-emitting unit, luminance per predetermined current can be increased, and the light-emitting device can have higher reliability than that with a single structure. To obtain white light emission with a tandem structure, the structure is made so that light from light-emitting layers of the plurality of light-emitting units can be combined to be white light. Note that a combination of emission colors for obtaining white light emission is similar to that in the case of a single structure. Note that in the device having a tandem structure, it is suitable to provide an intermediate layer typified by a charge-generation layer between a plurality of light-emitting units.

When a white light-emitting device and a light-emitting device having an SBS structure are compared with each other, the light-emitting device having the SBS structure can have lower power consumption than the white light-emitting device. Meanwhile, the white light-emitting device can achieve lower manufacturing cost and a higher manufacturing yield because the manufacturing process of the white light-emitting device is simpler than that of the light-emitting device having the SBS structure.

<Structure Example of Light-Emitting Device>

Figure 12A:
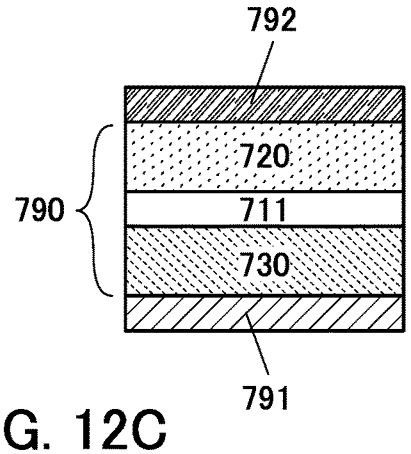
FIG. 12A to FIG. 12F are diagrams illustrating structure examples of light-emitting devices.

As illustrated in FIG. 12A, the light-emitting device includes an EL layer 790 between a pair of electrodes (a lower electrode 791 and an upper electrode 792). The EL layer 790 can be formed of a plurality of layers: a layer 720, a light-emitting layer 711, and a layer 730. The layer 720 can include, for example, a layer containing a substance with a high electron-injection property (an electron-injection layer) and a layer containing a substance with a high electron-transport property (an electron-transport layer). The light-emitting layer 711 contains a light-emitting compound, for example. The layer 730 can include a layer containing a substance having a high hole-injection property (a hole-injection layer) and a layer containing a substance having a high hole-transport property (a hole-transport layer), for example.

The structure including the layer 720, the light-emitting layer 711, and the layer 730 that are provided between a pair of electrodes can function as a single light-emitting unit, and the structure in FIG. 12A is referred to as a single structure in this specification.

Figure 12B:
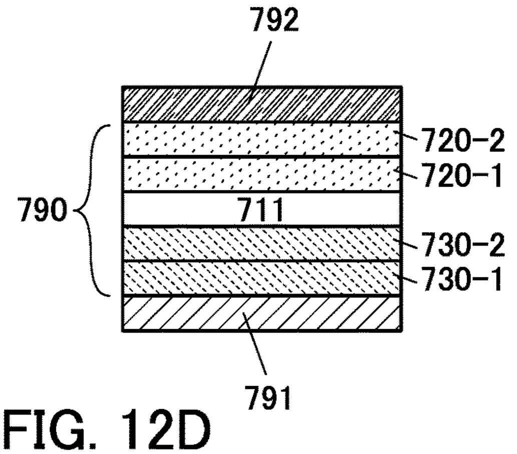

Specifically, a light-emitting device illustrated in FIG. 12B includes, over the lower electrode 791, a layer 730-1, a layer 730-2, the light-emitting layer 711, a layer 720-1, a layer 720-2, and the upper electrode 792. For example, the lower electrode 791 functions as an anode, and the upper electrode 792 functions as a cathode. In that case, the layer 730-1 functions as a hole-injection layer, the layer 730-2 functions as a hole-transport layer, the layer 720-1 functions as an electron-transport layer, and the layer 720-2 functions as an electron-injection layer. In contrast, when the lower electrode 791 functions as a cathode and the upper electrode 792 functions as an anode, the layer 730-1 functions as an electron-injection layer, the layer 730-2 functions as an electron-transport layer, the layer 720-1 functions as a hole-transport layer, and the layer 720-2 functions as a hole-injection layer. With such a layer structure, carriers can be efficiently injected to the light-emitting layer 711, and the efficiency of recombination of carriers in the light-emitting layer 711 can be increased.

Figure 12C:
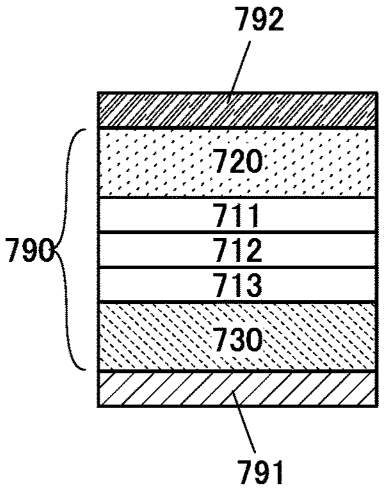
Figure 12D:
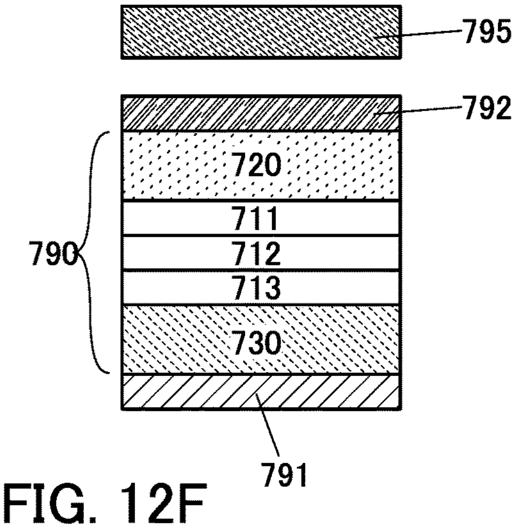

Note that the structures in which a plurality of light-emitting layers (light-emitting layers 711, 712, and 713) are provided between the layer 720 and the layer 730 as illustrated in FIG. 12C and FIG. 12D are also variations of the single structure.

Figure 12E:
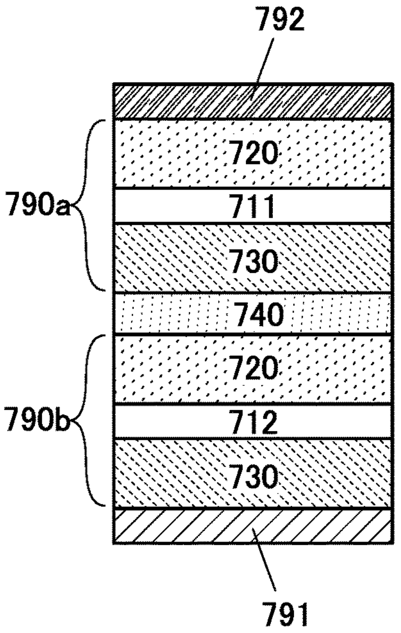

A structure in which a plurality of light-emitting units (an EL layer **790*a* and an EL layer 790*b*) are connected in series with an intermediate layer (a charge-generation layer) 740 therebetween as illustrated in FIG. 12E and FIG. 12**F is referred to as a tandem structure in this specification. The tandem structure may be referred to as a stack structure. Note that the tandem structure enables a light-emitting device capable of high luminance light emission.

In FIG. 12C, light-emitting materials that emit light of the same color or the same light-emitting material may be used for the light-emitting layer 711, the light-emitting layer 712, and the light-emitting layer 713. The stacked light-emitting layers can increase emission luminance.

Alternatively, different light-emitting materials may be used for the light-emitting layer 711, the light-emitting layer 712, and the light-emitting layer 713. White light emission can be obtained when the light-emitting layer 711, the light-emitting layer 712, and the light-emitting layer 713 emit light having a relationship of complementary colors. FIG. 12D illustrates an example in which a coloring layer 795 functioning as a color filter is provided. When white light passes through a color filter, light of a desired color can be obtained.

Figure 12F:
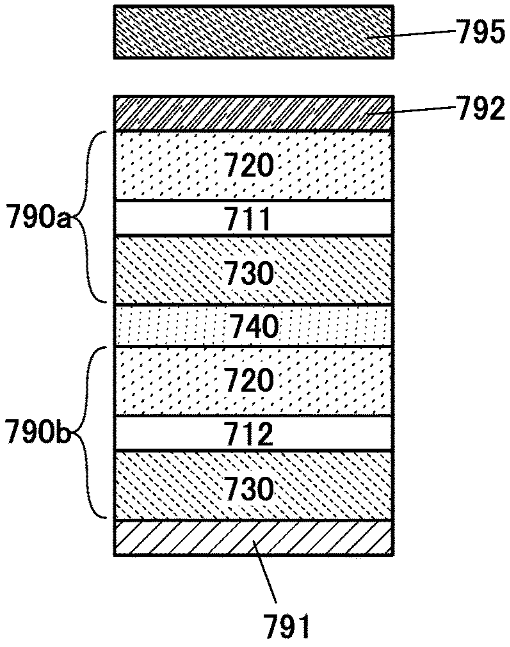

In addition, in FIG. 12E, light-emitting materials that emit light of the same color may be used for the light-emitting layer 711 and the light-emitting layer 712. Alternatively, light-emitting materials that emit light of different colors may be used for the light-emitting layer 711 and the light-emitting layer 712. White light emission can be obtained when the light-emitting layer 711 and the light-emitting layer 712 emit light having a relationship of complementary colors. FIG. 12F illustrates an example in which the coloring layer 795 is further provided.

Note that also in FIG. 12C, FIG. 12D, FIG. 12E, and FIG. 12F, the layer 720 and the layer 730 may each have a stacked-layer structure of two or more layers as illustrated in FIG. 12B.

In addition, in FIG. 12D, light-emitting materials that emit light of the same color may be used for the light-emitting layer 711, the light-emitting layer 712, and the light-emitting layer 713. Similarly, in FIG. 12F, light-emitting materials that emit light of the same color may be used for the light-emitting layer 711 and the light-emitting layer 712. In that case, when a color conversion layer is employed instead of the coloring layer 795, light of a desired color that is different from the color of the light-emitting material can be obtained. For example, a blue light-emitting material is used for each light-emitting layer and blue light passes through the color conversion layer, so that light with a wavelength longer than that of blue light (e.g., red light or green light) can be obtained. For the color conversion layer, a fluorescent material, a phosphorescent material, or quantum dots can be used.

The emission color of the light-emitting device can be red, green, blue, cyan, magenta, yellow, or white depending on the material that constitutes the EL layer 790. In addition, when the light-emitting device has a microcavity structure, color purity can be further increased.

In the light-emitting device that emits white light, a light-emitting layer may contain two or more kinds of light-emitting substances, or two or more light-emitting layers containing different light-emitting substances may be stacked. In such a case, the light-emitting substances are preferably selected such that the light-emitting substances emit light having a relationship of complementary colors.

[Light-Emitting Device]

A specific structure example of the light-emitting device is described here.

The light-emitting device includes at least the light-emitting layer. In addition, the light-emitting device may further include, as a layer other than the light-emitting layer, a layer containing a substance with a high hole-injection property, a substance with a high hole-transport property, a hole-blocking material, a substance with a high electron-transport property, an electron-blocking material, a substance with a high electron-injection property, or a substance with a bipolar property (a substance with a high electron-transport property and a high hole-transport property).

Either a low molecular compound or a high molecular compound can be used in the light-emitting device, and an inorganic compound may also be included. Each layer included in the light-emitting device can be formed by a method such as an evaporation method (including a vacuum evaporation method), a transfer method, a printing method, an inkjet method, or a coating method.

For example, the light-emitting device can include one or more of a hole-injection layer, a hole-transport layer, a hole-blocking layer, an electron-blocking layer, an electron-transport layer, and an electron-injection layer in addition to the light-emitting layer.

The hole-injection layer is a layer injecting holes from an anode to a hole-transport layer and containing a substance with a high hole-injection property. Examples of a substance with a high hole-injection property include an aromatic amine compound, and a composite material containing a hole-transport material and an acceptor material (an electron-accepting material).

The hole-transport layer is a layer transporting holes, which are injected from the anode by the hole-injection layer, to the light-emitting layer. The hole-transport layer is a layer containing a hole-transport material. The hole-transport material preferably has a hole mobility of higher than or equal to $1\times10^{-6}$ $cm^2/Vs$. Note that other substances can be also used as long as the substances have a hole-transport property higher than an electron-transport property. As the hole-transport material, a substance with a high hole-transport property, such as a π-electron rich heteroaromatic compound (e.g., a carbazole derivative, a thiophene derivative, or a furan derivative) or an aromatic amine (a compound having an aromatic amine skeleton) is preferable.

The electron-transport layer is a layer transporting electrons, which are injected from the cathode by the electron-injection layer, to the light-emitting layer. The electron-transport layer is a layer containing an electron-transport material. The electron-transport material preferably has an electron mobility of higher than or equal to $1\times10^{-6}$ $cm^2/Vs$. Note that other substances can be also used as long as the substances have an electron-transport property higher than a hole-transport property. As the electron-transport material, it is possible to use a substance with a high electron-transport property, such as a metal complex having a quinoline skeleton, a metal complex having a benzoquinoline skeleton, a metal complex having an oxazole skeleton, a metal complex having a thiazole skeleton, an oxadiazole derivative, a triazole derivative, an imidazole derivative, an oxazole derivative, a thiazole derivative, a phenanthroline derivative, a quinoline derivative having a quinoline ligand, a benzoquinoline derivative, a quinoxaline derivative, a dibenzoquinoxaline derivative, a pyridine derivative, a bipyridine derivative, a pyrimidine derivative, or a π-electron deficient heteroaromatic compound including a nitrogen-containing heteroaromatic compound.

The electron-injection layer is a layer injecting electrons from the cathode to the electron-transport layer and containing a substance with a high electron-injection property. As the substance with a high electron-injection property, an alkali metal, an alkaline earth metal, or a compound thereof can be used. As the substance with a high electron-injection property, a composite material containing an electron-transport material and a donor material (an electron-donating material) can be also used.

For the electron-injection layer, for example, an alkali metal, an alkaline earth metal, or a compound thereof, such as lithium, cesium, ytterbium, lithium fluoride (LiF), cesium fluoride (CsF), calcium fluoride ($CaF_2$), 8-(quinolinolato) lithium (abbreviation: Liq), 2-(2-pyridyl) phenolatolithium (abbreviation: LiPP), 2-(2-pyridyl)-3-pyridinolato lithium (abbreviation: LiPPy), 4-phenyl-2-(2-pyridyl) phenolatolithium (abbreviation: LiPPP), lithium oxide ($LiO_x$), or cesium carbonate can be used. In addition, the electron-injection layer may have a stacked-layer structure of two or more layers. In the stacked-layer structure, for example, lithium fluoride can be used for a first layer and ytterbium can be provided for a second layer.

Alternatively, as the above electron-injection layer, an electron-transport material may be used. For example, a compound having an unshared electron pair and having an electron deficient heteroaromatic ring can be used as the electron-transport material. Specifically, a compound having at least one of a pyridine ring, a diazine ring (a pyrimidine ring, a pyrazine ring, or a pyridazine ring), and a triazine ring can be used.

Note that the lowest unoccupied molecular orbital (LUMO) level of the organic compound having an unshared electron pair is preferably greater than or equal to −3.6 eV and less than or equal to −2.3 eV. In addition, in general, the highest occupied molecular orbital (HOMO) level and the LUMO level of an organic compound can be estimated by CV (cyclic voltammetry), photoelectron spectroscopy, optical absorption spectroscopy, or inverse photoelectron spectroscopy.

For example, 4,7-diphenyl-1,10-phenanthroline (abbreviation: BPhen), 2,9-di(naphthalen-2-yl)-4,7-diphenyl-1,10-phenanthroline (abbreviation: NBPhen), diquinoxalino[2,3-α:2',3'-c]phenazine (abbreviation: HATNA), or 2,4,6-tris[3'-(pyridin-3-yl)biphenyl-3-yl]-1,3,5-triazine (abbreviation: TmPPPyTz) can be used for the organic compound having an unshared electron pair. Note that NBPhen has a higher glass transition temperature (Tg) than BPhen and thus has high heat resistance.

The light-emitting layer is a layer containing a light-emitting substance. The light-emitting layer can contain one or more kinds of light-emitting substances. As the light-emitting substance, a substance that exhibits an emission color of blue, violet, bluish violet, green, yellowish green, yellow, orange, or red is used as appropriate. Alternatively, a substance that emits near-infrared light can be used as the light-emitting substance.

Examples of the light-emitting substance include a fluorescent material, a phosphorescent material, a TADF material, and a quantum dot material.

Examples of a fluorescent material include a pyrene derivative, an anthracene derivative, a triphenylene derivative, a fluorene derivative, a carbazole derivative, a dibenzothiophene derivative, a dibenzofuran derivative, a dibenzoquinoxaline derivative, a quinoxaline derivative, a pyridine derivative, a pyrimidine derivative, a phenanthrene derivative, and a naphthalene derivative.

Examples of a phosphorescent material include an organometallic complex (particularly an iridium complex) having a 4H-triazole skeleton, a 1H-triazole skeleton, an imidazole skeleton, a pyrimidine skeleton, a pyrazine skeleton, or a pyridine skeleton; an organometallic complex (particularly an iridium complex) having a phenylpyridine derivative including an electron-withdrawing group as a ligand; a platinum complex; and a rare earth metal complex.

The light-emitting layer may contain one or more kinds of organic compounds (a host material and an assist material) in addition to the light-emitting substance (a guest material). As one or more kinds of organic compounds, one or both of a hole-transport material and an electron-transport material can be used. Alternatively, as one or more kinds of organic compounds, a bipolar material or a TADF material may be used.

The light-emitting layer preferably includes a phosphorescent material and a combination of a hole-transport material and an electron-transport material that easily forms an exciplex, for example. Such a structure makes it possible to efficiently obtain light emission using ExTET (Exciplex-Triplet Energy Transfer), which is energy transfer from an exciplex to a light-emitting substance (a phosphorescent material). When a combination of materials is selected to form an exciplex that exhibits light emission whose wavelength is to overlap with the wavelength of the lowest-energy-side absorption band of the light-emitting substance, energy can be transferred smoothly and light emission can be obtained efficiently. With this structure, the high efficiency, low-voltage driving, and long lifetime of the light-emitting device can be achieved at the same time.

At least part of the structure examples and the drawings corresponding thereto exemplified in this embodiment can be combined with the other structure examples and the other drawings as appropriate.

At least part of this embodiment can be implemented in appropriate combination with the other embodiments described in this specification.

Embodiment 7

In this embodiment, a light-receiving device that can be used in the display device of one embodiment of the present invention and a display device having a function of receiving and emitting light will be described.

For example, a pn-type or pin-type photodiode can be used as the light-receiving device. The light-receiving device functions as a photoelectric conversion device (also referred to as a photoelectric conversion element) that detects light entering the light-receiving device and generates charge. The amount of charge generated from the light-receiving device depends on the amount of light entering the light-receiving device.

It is particularly preferable to use an organic photodiode including a layer containing an organic compound, as the light-receiving device. An organic photodiode, which is easily made thin, lightweight, and large in area and has a high degree of freedom for shape and design, can be employed in a variety of display devices.

[Light-Receiving Device]

Figure 13A:
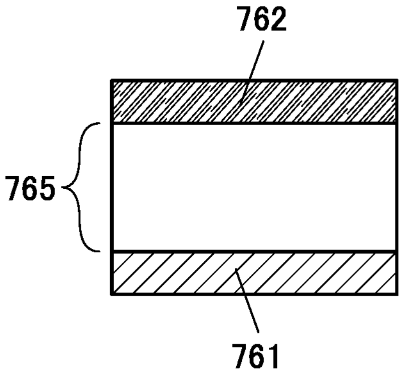
FIG. 13A and FIG. 13B are diagrams illustrating structure examples of light-receiving devices.

As illustrated in FIG. 13A, the light-receiving device includes a layer 765 between a pair of electrodes (a lower electrode 761 and an upper electrode 762). The layer 765 includes at least one active layer, and may further include another layer.

Figure 13B:
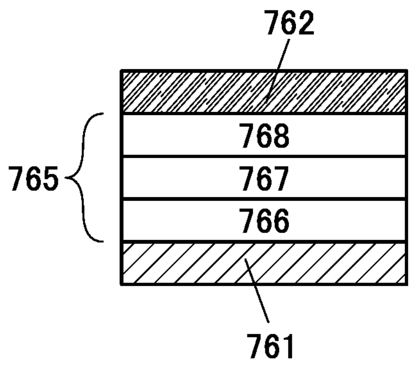

In addition, FIG. 13B is a modification example of the layer 765 included in the light-receiving device illustrated in FIG. 13A. Specifically, the light-receiving device illustrated in FIG. 13B includes a layer 766 over the lower electrode 761, an active layer 767 over the layer 766, a layer 768 over the active layer 767, and the upper electrode 762 over the layer 768.

The active layer 767 functions as a photoelectric conversion layer.

In the case where the lower electrode 761 is an anode and the upper electrode 762 is a cathode, the layer 766 includes one or both of a hole-transport layer and an electron-blocking layer. In addition, the layer 768 includes one or both of an electron-transport layer and a hole-blocking layer. In the case where the lower electrode 761 is a cathode and the upper electrode 762 is an anode, the structures of the layer 766 and the layer 768 are interchanged.

Here, the display device of one embodiment of the present invention includes a layer shared by the light-receiving device and the light-emitting device (the layer can be also regarded as a continuous layer shared by the light-receiving device and the light-emitting device) in some cases. The function of such a layer in the light-emitting device is different from its function in the light-receiving device in some cases. In this specification, the name of a component is based on its function in the light-emitting device in some cases. For example, a hole-injection layer functions as a hole-injection layer in the light-emitting device and functions as a hole-transport layer in the light-receiving device. Similarly, an electron-injection layer functions as an electron-injection layer in the light-emitting device and functions as an electron-transport layer in the light-receiving device. In addition, a layer shared by the light-receiving device and the light-emitting device might have the same function in the light-emitting device and the light-receiving device. The hole-transport layer functions as a hole-transport layer in both the light-emitting device and the light-receiving device, and the electron-transport layer functions as an electron-transport layer in both the light-emitting device and the light-receiving device.

Next, materials that can be used for the light-receiving device are described.

Either a low molecular compound or a high molecular compound can be used in the light-receiving device, and an inorganic compound may be contained. Each layer included in the light-receiving device can be formed by an evaporation method (including a vacuum evaporation method), a transfer method, a printing method, an inkjet method, or a coating method.

The active layer included in the light-receiving device contains a semiconductor. Examples of the semiconductor include an inorganic semiconductor typified by silicon and an organic semiconductor including an organic compound. This embodiment describes an example in which an organic semiconductor is used as the semiconductor contained in the active layer. The use of an organic semiconductor is preferable because the light-emitting layer and the active layer can be formed by the same method (e.g., a vacuum evaporation method) and thus a manufacturing apparatus can be used in common.

Examples of an n-type semiconductor material contained in the active layer include electron-accepting organic semiconductor materials such as fullerene (e.g., $C_{60}$ or $C_{70}$) and fullerene derivatives. Examples of fullerene derivatives include [6,6]-Phenyl-C71-butyric acid methyl ester (abbreviation: PC70BM), [6,6]-Phenyl-C61-butyric acid methyl ester (abbreviation: PC60BM), and 1',1",4',4"-Tetrahydro-di[1,4]methanonaphthaleno[1,2:2',3',56,60:2",3"][5,6]fullerene-C60 (abbreviation: ICBA).

Other examples of the n-type semiconductor material include perylenetetracarboxylic acid derivatives typified by N,N'-dimethyl-3,4,9,10-perylenetetracarboxylic diimide (abbreviation: Me-PTCDI) and 2,2'-(5,5'-(thieno[3,2-b]thiophene-2,5-diyl)bis(thiophene-5,2-diyl)bis(methan-1-yl-1-ylidene)dimalononitrile (abbreviation: FT2TDMN).

Other examples of the n-type semiconductor material include a metal complex having a quinoline skeleton, a metal complex having a benzoquinoline skeleton, a metal complex having an oxazole skeleton, a metal complex having a thiazole skeleton, an oxadiazole derivative, a triazole derivative, an imidazole derivative, an oxazole derivative, a thiazole derivative, a phenanthroline derivative, a quinoline derivative, a benzoquinoline derivative, a quinoxaline derivative, a dibenzoquinoxaline derivative, a pyridine derivative, a bipyridine derivative, a pyrimidine derivative, a naphthalene derivative, an anthracene derivative, a coumarin derivative, a rhodamine derivative, a triazine derivative, and a quinone derivative.

Examples of a p-type semiconductor material contained in the active layer include electron-donating organic semiconductor materials such as copper (II) phthalocyanine (CuPc), tetraphenyldibenzoperiflanthene (DBP), zinc phthalocyanine (ZnPc), tin phthalocyanine (SnPc), quinacridone, and rubrene.

Other examples of the p-type semiconductor material include a carbazole derivative, a thiophene derivative, a furan derivative, and a compound having an aromatic amine skeleton. Furthermore, other examples of the p-type semiconductor material include a naphthalene derivative, an anthracene derivative, a pyrene derivative, a triphenylene derivative, a fluorene derivative, a pyrrole derivative, a benzofuran derivative, a benzothiophene derivative, an indole derivative, a dibenzofuran derivative, a dibenzothiophene derivative, an indolocarbazole derivative, a porphyrin derivative, a phthalocyanine derivative, a naphthalocyanine derivative, a quinacridone derivative, a rubrene derivative, a tetracene derivative, a polyphenylene vinylene derivative, a polyparaphenylene derivative, a polyfluorene derivative, a polyvinylcarbazole derivative, and a polythiophene derivative.

The HOMO level of the electron-donating organic semiconductor material is preferably shallower (higher) than the HOMO level of the electron-accepting organic semiconductor material. The LUMO level of the electron-donating organic semiconductor material is preferably shallower (higher) than the LUMO level of the electron-accepting organic semiconductor material.

Fullerene having a spherical shape is preferably used as the electron-accepting organic semiconductor material, and an organic semiconductor material having a substantially planar shape is preferably used as the electron-donating organic semiconductor material. Molecules of similar shapes tend to aggregate, and aggregated molecules of similar kinds, which have molecular orbital energy levels close to each other, can increase a carrier-transport property.

In addition, for the active layer, a high molecular compound typified by Poly[[4,8-bis[5-(2-ethylhexyl)-2-thienyl]benzo[1,2-b: 4,5-b']dithiophene-2,6-diyl]-2,5-thiophenediyl[5,7-bis(2-ethylhexyl)-4,8-dioxo-4H,8H-benzo[1,2-c: 4,5-c']dithiophene-1,3-diyl]] polymer (abbreviation: PBDB-T) or a PBDB-T derivative, which functions as a donor, can be used. For example, a method in which an acceptor material is dispersed to PBDB-T or a PBDB-T derivative can be used.

For example, the active layer is preferably formed by co-evaporation of an n-type semiconductor and a p-type semiconductor. Alternatively, the active layer may be formed by stacking an n-type semiconductor and a p-type semiconductor.

In addition, three or more kinds of materials may be mixed for the active layer. For example, a third material may be mixed with an n-type semiconductor material and a p-type semiconductor material in order to extend a wavelength range. In that case, the third material may be either a low molecular compound or a high molecular compound.

As a layer other than the active layer, the light-receiving device may further include a layer containing a substance with a high hole-transport property, a substance with a high electron-transport property, or a substance with a bipolar property (a substance with a high electron-transport property and a high hole-transport property). Furthermore, without limitation to the above, a layer containing a substance with a high hole-injection property, a hole-blocking material, a substance with a high electron-injection property, or an electron-blocking material may be further included. A material that can be used for the light-emitting device can be used for layers other than the active layer included in the light-receiving device.

As the hole-transport material or the electron-blocking material, a high molecular compound typified by poly(3,4-ethylenedioxythiophene)/poly(styrenesulfonic acid) (PEDOT/PSS), or an inorganic compound typified by a molybdenum oxide or copper iodide (CuI) can be used, for example. In addition, as the electron-transport material or the hole-blocking material, an inorganic compound typified by zinc oxide (ZnO) or an organic compound typified by polyethylenimine ethoxylate (PEIE) can be used. The light-receiving device may include a mixed film of PEIE and ZnO, for example.

[Display Device Having Light Detection Function]

In the display device of one embodiment of the present invention, the light-emitting devices are arranged in a matrix in a display portion, and an image can be displayed on the display portion. Furthermore, the light-receiving devices are arranged in a matrix in the display portion, and the display portion has one or both of an imaging function and a sensing function in addition to an image displaying function. The display portion can be used as an image sensor or a touch sensor. That is, by detecting light with the display portion, an image can be captured or the approach or contact of a target (a finger, a hand, or a pen) can be detected.

Furthermore, in the display device of one embodiment of the present invention, the light-emitting device can be used as a light source of the sensor portion. In the display device of one embodiment of the present invention, when an object reflects (or scatters) light emitted from the light-emitting device included in the display portion, the light-receiving device can detect reflected light (or scattered light); thus, imaging or touch detection is possible even in a dark place.

Accordingly, neither a light-receiving portion nor a light source does not need to be provided separately from the display device, and thus the number of components of an electronic device can be reduced. For example, it is not necessary to separately provide a biometric authentication device provided in the electronic device or a capacitive touch panel for scrolling. Thus, with the use of the display device of one embodiment of the present invention, the electronic device can be provided with reduced manufacturing cost.

Specifically, the display device of one embodiment of the present invention includes a light-emitting device and a light-receiving device in a pixel. In the display device of one embodiment of the present invention, an organic EL device is used as the light-emitting device, and an organic photodiode is used as the light-receiving device. The organic EL device and the organic photodiode can be formed over the same substrate. Thus, the organic photodiode can be incorporated in the display device using the organic EL device.

In the display device including the light-emitting device and the light-receiving device in the pixel, the pixel has a light-receiving function, which enables detection of the touch or approach of an object while an image is displayed. For example, all the subpixels included in the display device can display an image; alternatively, some subpixels can emit light as a light source and the other subpixels can display an image.

In the case where the light-receiving device is used as an image sensor, the display device can capture an image with the use of the light-receiving device. For example, the display device of this embodiment can be used as a scanner.

For example, imaging for personal authentication with the use of a fingerprint, a palm print, an iris, the shape of a blood vessel (including the shape of a vein and the shape of an artery), or a face is possible by using the image sensor.

For example, an image of the periphery of an eye, the surface of the eye, or the inside (fundus) of the eye of a user of a wearable device can be captured with the use of the image sensor. Therefore, the wearable device can have a function of detecting any one or more selected from a blink, movement of an iris, and movement of an eyelid of the user.

In addition, the light-receiving device can be used in a touch sensor (also referred to as a direct touch sensor), a near touch sensor (also referred to as a hover sensor, a hover touch sensor, a contactless sensor, or a touchless sensor), or the like.

Here, a touch sensor or a near touch sensor can detect the approach or touch of an object (a finger, a hand, or a pen).

The touch sensor can detect an object when the display device and the object come in direct contact with each other. In addition, the near touch sensor can detect an object even when the object is not in contact with the display device. For example, the display device is preferably capable of detecting an object when the distance between the display device and the object is greater than or equal to 0.1 mm and less than or equal to 300 mm, preferably greater than or equal to 3 mm and less than or equal to 50 mm. This structure enables the display device to be operated without direct contact of the object, that is, enables the display device to be operated in a contactless (touchless) manner. With the above structure, the display device can have a reduced risk of being dirty or damaged, or can be operated without the object directly touching a dirt (e.g., dust or a virus) attached to the display device.

In addition, the refresh rate of the display device of one embodiment of the present invention can be variable. For example, the refresh rate is adjusted (adjusted in the range from 1 Hz to 240 Hz, for example) in accordance with contents displayed on the display device, so that power consumption can be reduced. Furthermore, the drive frequency of the touch sensor or the near touch sensor may be changed in accordance with the refresh rate. In the case where the refresh rate of the display device is 120 Hz, for example, a structure can be employed in which the drive frequency of the touch sensor or the near touch sensor is a frequency higher than 120 Hz (typically 240 Hz). This structure can achieve low power consumption and can increase the response speed of the touch sensor or the near touch sensor.

Figure 13C:
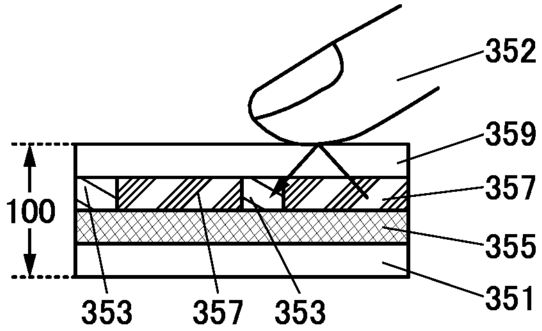
FIG. 13C to FIG. 13E are diagrams illustrating structure examples of a display device.
Figure 13D:
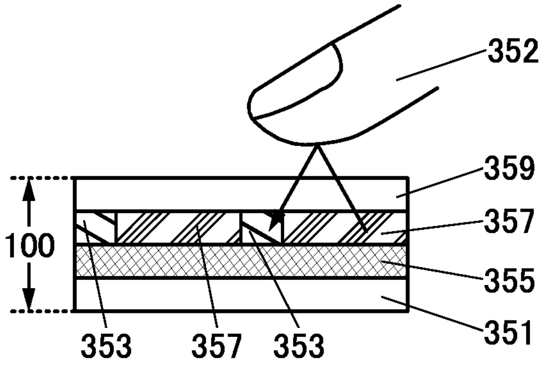
Figure 13E:
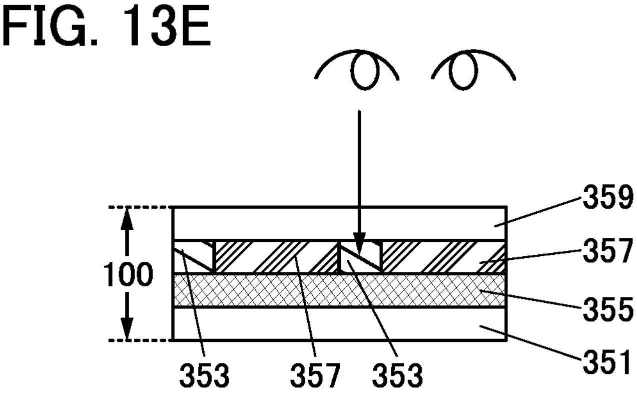

The display device 100 illustrated in FIG. 13C to FIG. 13E includes layers 353 each including a light-receiving device, a functional layer 355, and layers 357 each including a light-emitting device, between a substrate 351 and a substrate 359.

The functional layer 355 includes a circuit for driving a light-receiving device and a circuit for driving a light-emitting device. One or more of a switch, a transistor, a capacitor, a resistor, a wiring, and a terminal can be provided in the functional layer 355. Note that in the case where the light-emitting device and the light-receiving device are driven by a passive-matrix method, a structure provided with neither a switch nor a transistor may be employed.

For example, when light emitted from the light-emitting device in the layer 357 including the light-emitting device is reflected by a finger 352 touching the display device 100 as illustrated in FIG. 13C, the light-receiving device in the layer 353 including the light-receiving device detects the reflected light. Thus, the touch of the finger 352 on the display device 100 can be detected.

Alternatively, as illustrated in FIG. 13D and FIG. 13E, the display device may have a function of detecting an object that is close to (i.e., not touching) the display device or capturing an image of such an object. FIG. 13D illustrates an example in which a human finger is detected, and FIG. 13E illustrates an example in which information on the periphery, surface, or inside of the human eye (the number of blinks, movement of an eyeball, and movement of an eyelid) is detected.

At least part of this embodiment can be implemented in appropriate combination with the other embodiments described in this specification.

REFERENCE NUMERALS

60H: head, 61A: display device, 61B: display device, 61C: display device, 61D: display device, 61E: display device, 61F: display device, 61G: display device, 61H: display device, 61J: display device, 62: arrow mark, 63: display region, 64: non-display region, 100: display device, 101: substrate, 110: light-emitting element, 110*a*: light-emitting element, 110*b*: light-emitting element, 110B: light-emitting element, 110*c*: light-emitting element, 110G: light-emitting element, 110R: light-emitting element, 111: pixel electrode, 111B: pixel electrode, 111C: connection electrode, 111G: pixel electrode, 111R: pixel electrode, 112: organic layer, 112B: organic layer, 112G: organic layer, 112R: organic layer, 113: common electrode, 114: common layer, 121: protective layer, 124*a*: pixel, 124*b*: pixel, 125: insulating layer, 126: resin layer, 128: layer, 140: connection portion, 150: pixel, 202: transistor, 204: connection portion, 209: transistor, 210: transistor, 211: insulating layer, 212: insulating layer, 214: insulating layer, 215: insulating layer, 218: insulating layer, 221: conductive layer, 222*a*: conductive layer, 222*b*: conductive layer, 223: conductive layer, 225: insulating layer, 228: connection portion, 231: semiconductor layer, 231*i*: channel formation region, 231*n*: low-resistance region, 242: connection layer, 351: substrate, 352: finger, 353: layer, 355: functional layer, 357: layer, 359: substrate, 400: display device, 411*a*: conductive layer, 411*b*: conductive layer, 411*c*: conductive layer, 412B: EL layer, 412G: EL layer, 413: common electrode, 414: common layer, 416: protective layer, 421: insulating layer, 422: resin layer, 424: layer, 430*b*: light-emitting element, 430*c*: light-emitting element, 442: adhesive layer, 451: substrate, 452: substrate, 455: adhesive layer, 462: display portion, 464: circuit, 465: wiring, 466: conductive layer, 472: FPC, 473: IC, 711: light-emitting layer, 712: light-emitting layer, 713: light-emitting layer, 720: layer, 720-1: layer, 720-2: layer, 730: layer, 730-1: layer, 730-2: layer, 761: lower electrode, 762: upper electrode, 765: layer, 766: layer, 767: active layer, 768: layer, 790: EL layer, 790*a*: EL layer, 790*b*: EL layer, 791: lower electrode, 792: upper electrode, 795: coloring layer

The invention claimed is:

1. A display device comprising:

a flexible substrate, a display surface; and a first light-emitting element and a second light-emitting element sandwiched between the flexible substrate and the display surface, wherein the display surface is positioned at least on a front side of a user's visual field, wherein the display device comprises a curved surface, wherein when a user's neck is moved, the display device is configured not to change an image in according to a direction of the user's neck, wherein a first organic layer is positioned over a first pixel electrode of the first light-emitting element, wherein a second organic layer is positioned over a second pixel electrode of the second light-emitting element, wherein a resin layer comprises a region between the first pixel electrode and the second pixel electrode, a region overlapping with the first organic layer, and a region overlapping with the second organic layer, wherein a common electrode overlaps with the first pixel electrode with the first organic layer therebetween and overlaps with the second pixel electrode with the second organic layer therebetween, and wherein a layer is positioned between a top surface of the first organic layer and the resin layer.

2. The display device according to claim 1, wherein at least part of the display surface has a band shape, a cylindrical shape, or a hemispherical shape.

3. The display device according to claim 1 comprising a first sensor portion sensing a user's head on the user's side of the display device.

4. The display device according to claim 1 comprising a second sensor portion sensing user's surroundings on a side opposite to the user's side of the display device.

5. The display device according to claim 1 comprising one display surface obtained by combining a plurality of display panels.

6. The display device according to claim 1, wherein the display surface is placed on the front side and also on a side surface of the user's visual field.

7. The display device according to claim 1, wherein the display surface is placed on the front side and also on an upper side of the user's visual field.

8. The display device according to claim 1, wherein an outside view is displayed on the display surface, and wherein the outside view is a view of user's surroundings on a side opposite to the user's side of the display device.

* * * * *